US012390043B2

(12) United States Patent
Carbonini et al.

(10) Patent No.: US 12,390,043 B2
(45) Date of Patent: Aug. 19, 2025

(54) SYSTEM, MACHINE AND CONTAINER FOR PREPARING FLUID FOOD PRODUCTS

(71) Applicant: LUIGI LAVAZZA S.p.A., Turin (IT)

(72) Inventors: Carlo Carbonini, Turin (IT); Carlo De Mango, Turin (IT); Luca Bugnano, Turin (IT)

(73) Assignee: LUIGI LAVAZZA S.P.A., Turin (IT)

( * ) Notice: Subject to any disclaimer, the term of this patent is extended or adjusted under 35 U.S.C. 154(b) by 886 days.

(21) Appl. No.: 17/597,688

(22) PCT Filed: Jul. 16, 2020

(86) PCT No.: PCT/IB2020/056678
§ 371 (c)(1),
(2) Date: Jan. 18, 2022

(87) PCT Pub. No.: WO2021/014284
PCT Pub. Date: Jan. 28, 2021

(65) Prior Publication Data
US 2022/0240710 A1  Aug. 4, 2022

(30) Foreign Application Priority Data
Jul. 19, 2019  (IT) .................... 102019000012381

(51) Int. Cl.
*A47J 31/36*  (2006.01)
*A47J 31/40*  (2006.01)
*B65D 85/804*  (2006.01)

(52) U.S. Cl.
CPC ......... *A47J 31/407* (2013.01); *A47J 31/3628* (2013.01); *B65D 85/8043* (2013.01); *A47J 31/3695* (2013.01)

(58) Field of Classification Search
CPC ................ A47J 31/3623; A47J 31/3628; A47J 31/3695; A47J 31/369; A47J 31/407; B65D 85/8043
(Continued)

(56) References Cited

U.S. PATENT DOCUMENTS 8,561,524 B2 * 10/2013 DeMiglio ........... A47J 31/0689
99/305
11,666,174 B2 * 6/2023 Van De Sluis ........... A23L 2/54
222/4
(Continued)

FOREIGN PATENT DOCUMENTS

| CN | 1842289 A | 10/2006 |
|---|---|---|
| CN | 114096183 A | 2/2022 |

(Continued)

OTHER PUBLICATIONS

International Search Report for PCT/IB2020/056678 mailed Oct. 2, 2020, 4 pages.
(Continued)

*Primary Examiner* — Reginald Alexander
(74) *Attorney, Agent, or Firm* — Nixon & Vanderhye P.C.; Lars H. Genieser

(57) ABSTRACT

A system for preparing a food product comprises a sealed disposable container (11) and a preparation machine (1), having a hydraulic circuit that comprises at least one water-supply source, means for heating water and pumping means, as well as a first dispensing element (51), which can be supplied with pressurized hot water and/or steam. The entry wall (13) of the disposable container (11) has at least one axially hollow coupling element (18, 26), which defines at least part of an inlet of the disposable container (11). The disposable container (11) comprises an axially extending injector element (20), which can be coupled to the at least one coupling element (18, 26) or is formed integrally
(Continued)

therewith in such a way that at least one first distal portion of the injector element (20) extends within the internal volume (16). The first dispensing element (51) and the at least one coupling element (18, 26) of the disposable container (11) are configured for mutual coupling, and the hydraulic circuit (40) can be controlled for conveying pressurized hot water and/or steam to the first dispensing element (51), for the corresponding injection into the internal volume (16) of the disposable container (11) through the injector element (20).

20 Claims, 15 Drawing Sheets

(58) Field of Classification Search
USPC .......................................................... 99/295
See application file for complete search history.

(56) References Cited

U.S. PATENT DOCUMENTS

| 2003/0051603 | A1 | 3/2003 | Yoakim et al. |
| 2008/0236401 | A1* | 10/2008 | Levin .................... A47J 31/005 99/302 R |
| 2011/0256287 | A1 | 10/2011 | Sus et al. |
| 2013/0017303 | A1* | 1/2013 | Vu ....................... A47J 31/0689 426/433 |
| 2014/0123859 | A1* | 5/2014 | Verbeek ............. B65D 85/8055 426/115 |
| 2015/0257582 | A1* | 9/2015 | Oh ........................ A47J 31/407 426/431 |
| 2015/0327717 | A1* | 11/2015 | Burrows ............. A47J 31/3628 99/295 |
| 2016/0249764 | A1 | 9/2016 | Aardenburg |
| 2017/0355585 | A1 | 12/2017 | Van De Sluis et al. |

FOREIGN PATENT DOCUMENTS

| CN | 114096184 A | 2/2022 |
| EP | 1 092 378 | 4/2001 |
| EP | 2 036 471 | 3/2009 |
| EP | 2236437 A1 | 10/2010 |
| IT | MI20 101 565 | 2/2012 |
| JP | 2000-109140 | 4/2000 |
| WO | 2018/113861 | 6/2018 |

OTHER PUBLICATIONS

Written Opinion of the ISA for PCT/IB2020/056678 mailed Oct. 2, 2020, 6 pages.

* cited by examiner

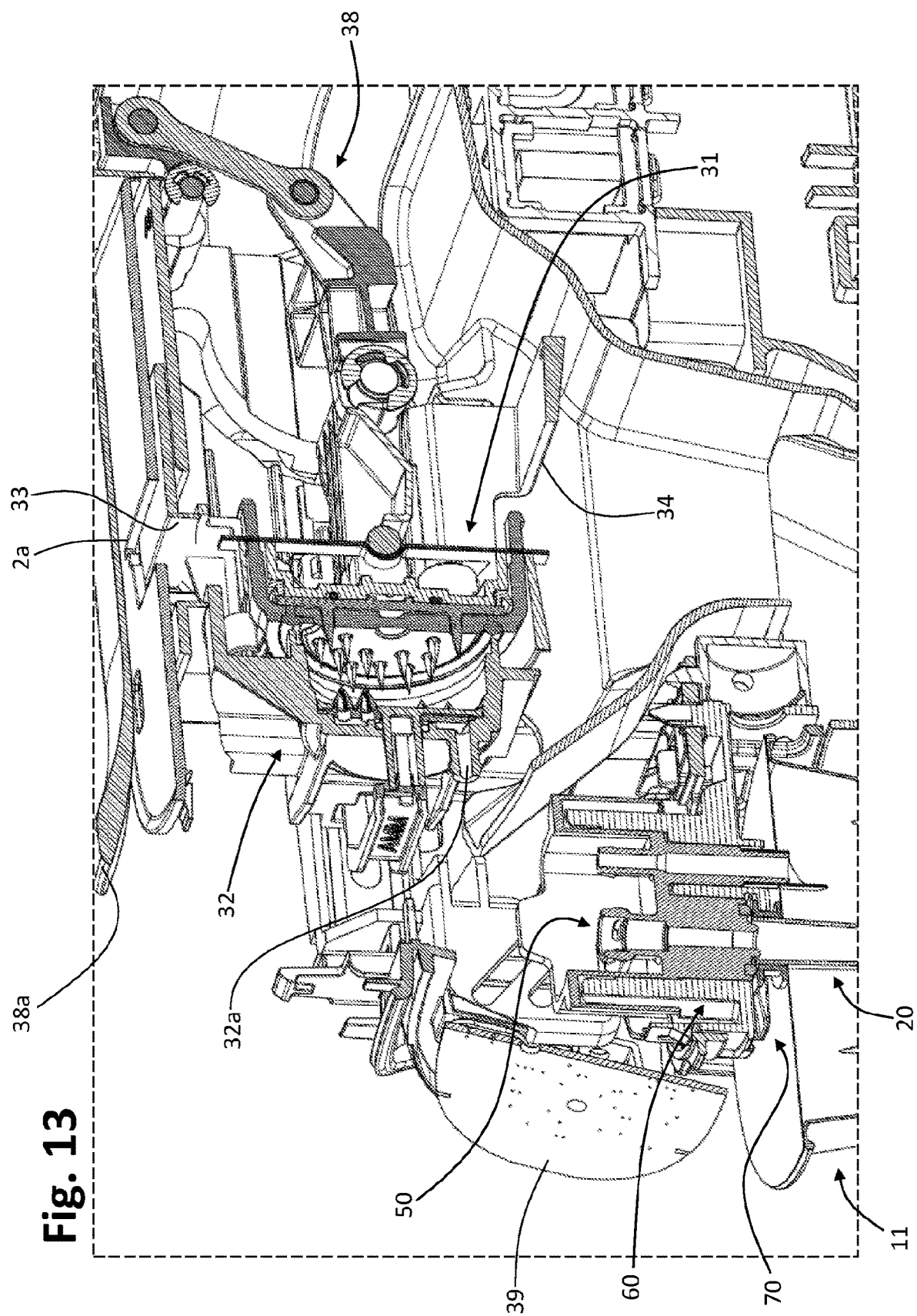

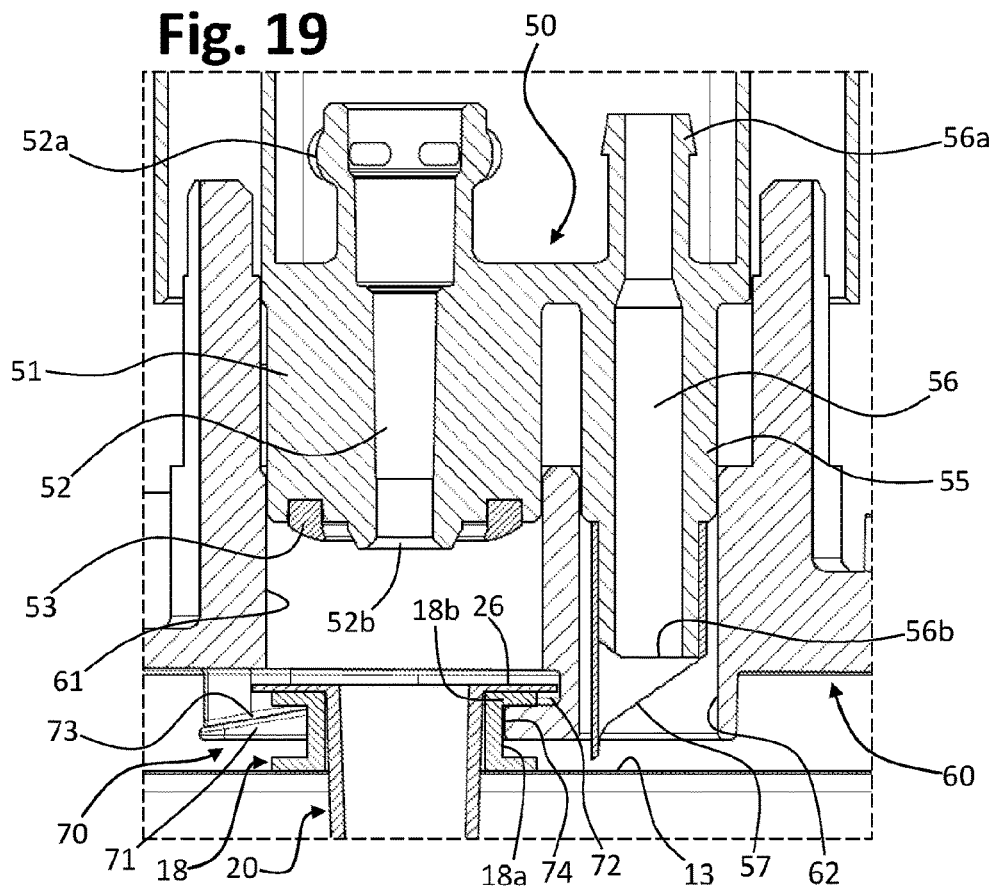
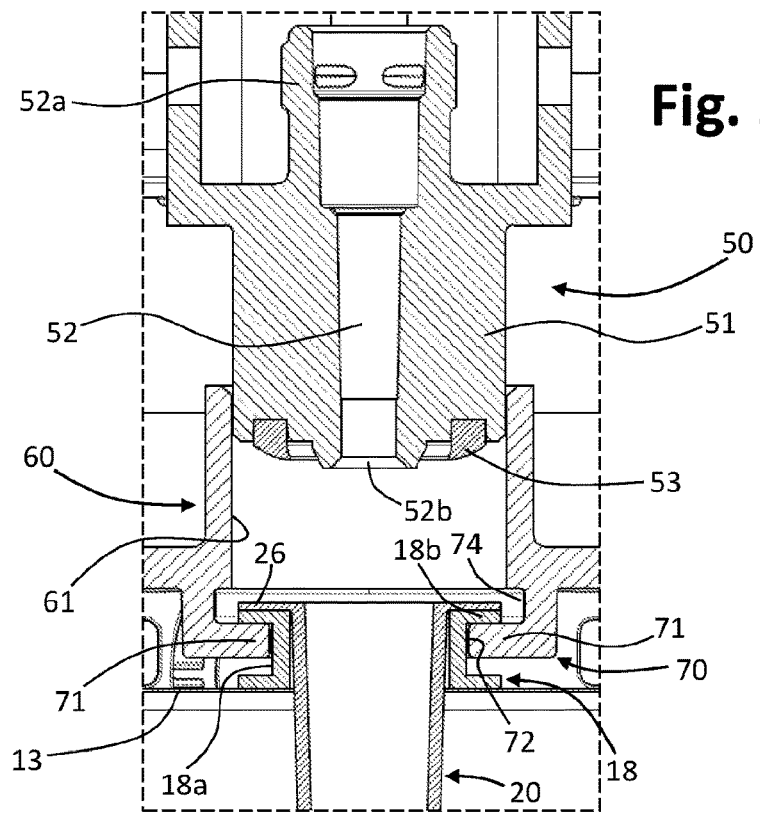

SYSTEM, MACHINE AND CONTAINER FOR PREPARING FLUID FOOD PRODUCTS

This application is the U.S. national phase of International Application No. PCT/IB2020/056678 filed Jul. 16, 2020 which designated the U.S. and claims priority to IT Patent Application No. 102019000012381 filed Jul. 19, 2019, the entire contents of each of which are hereby incorporated by reference.

TECHNICAL FIELD

The present invention relates to the subject of preparation of fluid food products, i.e., liquid or semi-liquid products, in particular via automatic and semiautomatic preparation machines. The techniques described have been developed with particular reference to the systems, machines, and kits for preparing liquid food products that may also comprise a number of ingredients that can be processed separately, or food products preparation of which envisages the use of at least one perishable ingredient, or preparation of which envisages the use of steam.

PRIOR ART

Preparation of liquid products by automatic preparation machines, for example machines for domestic or community use, is widespread, in particular for preparing hot beverages that may also include a number of ingredients.

In some known solutions, various ingredients of a given hot beverage are pre-packaged in a capsule, either sealed or not sealed, and the preparation machine is prearranged for treating the capsule in order to dispense the beverage. Typically, the machine is designed for loading the capsule into a preparation or brewing chamber, which, in the case of a sealed capsule, is provided with means for piercing the capsule itself.

Supplied to an inlet of the brewing chamber is a preparation fluid at a high temperature, represented in general by heated water and/or steam, so that the aforesaid fluid dissolves the ingredients contained in the capsule (in the case of soluble ingredients) or else extracts therefrom the substances and flavours useful for preparation of the beverage (in the case of infusion ingredients). The beverage thus obtained comes out of the brewing chamber through a corresponding outlet and is dispensed via a nozzle into a collection container, typically represented by a tea cup, or a coffee cup, or a glass.

This type of preparation, albeit very practical and hygienic, does not in general enable beverages to be obtained of a quality comparable to the ones that can be obtained via a manual preparation of the various ingredients, in particular a separate preparation thereof, with subsequent combination or mixing. Consider, for example, the case of the beverage cappuccino: in the case of preparation via a capsule, this must contain both the precursor of an espresso coffee, generally represented by ground coffee for brewing or else soluble coffee, and the precursor of a liquid milk, in general represented by powdered milk, which are extracted and/or dissolved and mixed directly in the capsule, with subsequent dispensing of the mixture into a collection container, for example a cup.

Even when the capsules and/or the corresponding preparation machines are designed to enable production of abundant froth in the beverage dispensed, the result obtained is not in general of a qualitative level comparable to what can be obtained via separate preparation of an espresso coffee and of a dose of liquid milk heated and frothed using steam, with their subsequent combination in a collection container for final consumption. Similar problems also exist in the case of machines designed for preparing a cappuccino (or other liquid product with a number of ingredients), by processing in rapid succession two different capsules, for example one containing the precursor of the espresso coffee and the other the precursor of the liquid milk, with the two beverages that are dispensed one after another into one and the same collection container.

Many preparation machines are thus prearranged to enable dispensing of hot water or steam also outside the brewing chamber, via a specific nozzle or wand, which can be manually oriented by a user, where so desired. In this way, once again with reference the preparation of a cappuccino, the user is in the condition of exploiting the wand for dispensing the steam necessary to heat and froth the milk contained in a container (for example, a cup), and then add in the same container a dose of espresso coffee, which can be obtained by means of a corresponding single-ingredient capsule, processed in the brewing chamber of the machine itself, and dispensed thereby in the ways described above. Other machines still are prearranged for connection to a purposely provided accessory container, known as milk frother, specifically designed for heating and frothing the milk by means of steam generated in the machine, and then enabling pouring of the heated and frothed milk into another container, to which a dose of espresso coffee produced via the same machine can then be added, for example using a single-ingredient capsule as explained above. Other known milk frothers are, instead, configured as functionally independent apparatuses of a preparation machine of the type referred to.

Even though the cappuccino that can be obtained is in general better than what can be produced via a capsule containing the precursors of the coffee and milk, also this second methodology of preparation implies some drawbacks.

A first problem is linked to the quality of the cappuccino prepared, which depends, in fact, not only upon the quality of the espresso coffee and of the starting liquid milk, but also upon the degree of skill of the person preparing the hot beverage. For instance, incorrect heating or frothing of the milk may have an effect on the goodness of the final beverage. The same applies in the case of an excessive or else reduced amount of frothed milk that is mixed with the espresso coffee, or else again in the case of a wrong amount of espresso coffee.

Another problem is linked to the hygienic requirements regarding the use of a biological liquid, as is milk. On account of its composition, the liquid milk is in fact an ideal substrate for the growth of micro-organisms, which may be harmful to human health: for this reason, the tools for preparing food that come into contact with this biological liquid should be thoroughly cleansed in relatively short times after use. Consequently, the wand of the preparation machine used for frothing the liquid milk necessary for preparation of the cappuccino should be washed or in any case cleaned in short times, and carefully, in order to prevent proliferation of micro-organisms. The same applies in the case of a preparation obtained using a milk frother, which also requires thorough washing after use.

Problems similar to the ones exemplified in relation to cappuccino may also exist as regards preparation of other fluid food products with a base of a number of ingredients, such as broths or soups, which can be processed via hot water or steam generated by a preparation machine of the type referred to.

OBJECT AND SUMMARY

In its general terms, the present invention has the aim to solve one or more of the drawbacks referred to.

According to a first aspect, the present invention is aimed at providing a system that is particularly advantageous, both from the hygienic standpoint and from the standpoint of simplicity of use, for on-the-spot preparation of food products using a preparation fluid dispensed by a dispensing element of a preparation machine.

According to a second aspect, the present invention is aimed at providing a particularly advantageous preparation machine in view of use thereof in a system of the type referred to.

According to a third aspect, the present invention is aimed at providing a pre-packaged container, preferably of a disposable type, that enables preparation and retention in a simple and intuitive way of a fluid high-quality food product, also based upon the use of at least one fresh ingredient, such as cow's milk, and that does not imply any contamination of the preparation machine on which the preparation container is used.

According to a fourth aspect, the present invention is aimed at providing such a system and/or such a machine and/or such a container devised so as to render the quality of the final food product substantially independent of the skill of the person carrying out on-the-spot preparation thereof.

According to a fifth aspect, the present invention is aimed at indicating new modalities for on-the-spot preparation of food products also comprising a number of ingredients on a preparation machine, these modalities being simple, efficient, and hygienic.

According to a sixth aspect, the present invention is aimed at providing kits or containers that can be used both for preparing and retaining a fluid food product and for subsequent consumption of the product.

One or more of the aforesaid aims are achieved by a system and/or by a machine and/or by a container and/or by a method for preparing a food product having the characteristics specified in the annexed claims. The claims form an integral part of the technical teaching provided herein.

BRIEF DESCRIPTION OF THE DRAWINGS

Further aims, characteristics and advantages of the invention will emerge from the ensuing description, with reference to the annexed drawings, which are provided purely by way of non-limiting example and in which:

FIGS. 12 and 13 are views similar to those of FIGS. 8 and 9, but with the machine in a second condition;

FIGS. 19 and 20 are views similar to those of FIGS. 15 and 16, with a disposable container in a condition of mechanical coupling with the dispensing head;

DESCRIPTION OF PREFERRED EMBODIMENTS

Reference to an embodiment in the framework of the present description is intended to indicate that a particular configuration, structure, or characteristic described in relation to the embodiment is comprised in at least one embodiment. Hence, phrases such as "in an embodiment", "in one embodiment", "in various embodiments" and the like that may be present in various points of this description do not necessarily refer to one and the same embodiment. Moreover, particular conformations, structures, or characteristics defined in this description may be combined in any adequate way in one or more embodiments, including ones different from those represented. The reference numbers and spatial references (such as "upper", "lower", "top", "bottom", etc.) used herein are provided merely for convenience and hence do not define the sphere of protection or the scope of the embodiments. In the figures, the same reference numbers are used to designate elements that are similar or technically equivalent to one another. In the ensuing description and in the attached claims, where not otherwise specified, terms such as "ingredient" or "food substance" are to be understood as referring indifferently to a single substance (for example, ground coffee) or else to a mixture of a number of substances (for example, ground coffee with the addition of a sweetener).

Figure 1:
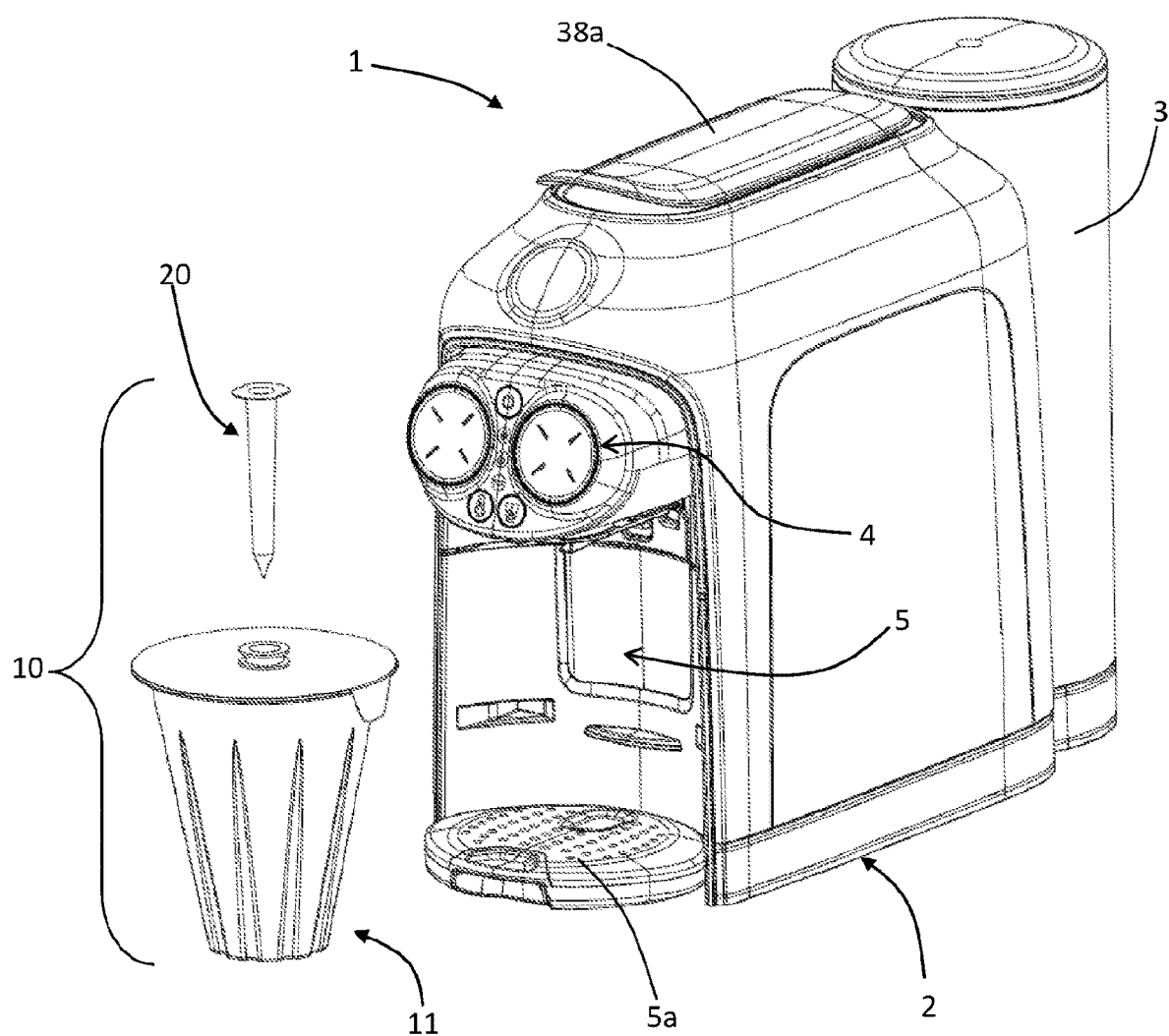
FIG. 1 is a schematic perspective view of a preparation system according to possible embodiments of the invention, comprising a preparation machine and a disposable container.

Represented schematically in FIG. 1 is a system for preparing fluid (i.e., liquid or semi-liquid) food products according to possible embodiments of the invention, comprising a preparation machine and a container that can be processed by the machine, the container possibly being configured as a kit. In various preferential embodiments, the aforesaid container or kit is of a disposable type. The container is configured for use in combination with the machine, for preparing a food product and retaining it, both during the preparation and subsequently, for example in view of its consumption. As will be seen, in particularly advantageous embodiments, the same container can be used directly by a user for consuming the food product.

The preparation machine, designated as a whole by 1, has a casing or stationary structure 2, to which a tank 3 is associated for containment of water that can be used for the purposes of preparation of food products, for example—but not exclusively—hot beverages. In addition or as an alternative to the tank 3, the machine 1 may be provided with a suitable system for connection to an external water system, for example a domestic system, for supply of the drinkable water potable necessary for operation.

In various preferential embodiments, the machine 1 has a brewing chamber, configured for receiving at least one dose of a precursor of a liquid food product and for dispensing this liquid food product following upon passage of water and/or steam through the brewing chamber. For this purpose, the machine 1 may comprise a suitable hydraulic circuit, configured for supplying pressurized hot water and/or steam to the brewing chamber. In various embodiments, the brewing chamber of the machine 1 is prearranged for receiving a capsule, or a pod, or a tablet that contains the aforesaid dose of precursor, but this does not constitute an essential characteristic.

In various embodiments, associated to the structure 2 of the machine 1, preferably in a front position, is a user interface 4, which comprises means for selection of programs and/or functions of the machine, such as keys, and/or push-buttons, and/or selectors, and warning means, such as warning lights, and/or light indicators, and/or an electronic display. Possibly, the user interface 4 may include a display of a touch-screen type, which performs both the function of means for selection and setting and the function of display and warning. Within the structure 2, for example in a position corresponding to the user interface 4, an electronic card can be mounted, in which at least part of the control system of the machine 1 is implemented. In addition or as an alternative to the user interface 4, the machine 1 may be equipped with a remote control and/or prearranged for being controlled at least in part via a smart device, such as a cellphone or tablet provided with a corresponding application software. The control system of the machine 1 may also be prearranged for connection—either wired or in wireless mode—to a communication network, for example a domestic network or a home-automation system.

In various embodiments, the structure 2 defines, preferably in a front position and/or underneath the user interface 4, a space or area 5 for positioning containers that can be used for collecting the hot beverages or for preparing and retaining them in accordance with the invention. Preferentially, the positioning space 5 is provided with a tray or lower support 5a, for resting thereon the aforesaid containers. The tray 5a can be of a height-adjustable type, to facilitate use of the usual containers having different heights, for example glasses, tea cups, coffee cups, and disposable containers according to possible embodiments of the invention. The space 5 is preferentially defined outside the structure 2 or casing of the machine 1; i.e., it is accessible directly by a user. The machine 1 may, however, also include a hatch, for access to a protected space 5.

Designated as a whole by 10 is an example of disposable container, in the form of a kit, that can be used in combination with the machine 1 for preparation and retention of a food product. As will emerge clearly hereinafter, in various embodiments, such a food product can be prepared using the container kit 10 and at least one preparation fluid that can be supplied directly by the preparation machine 1, outside the corresponding brewing chamber.

In various embodiments, the kit 10 comprises at least one pre-packaged sealed container 11, in particular of a disposable type. In preferential embodiments, the container kit 10 comprises a disposable tubular injector element 20; in the example illustrated, the pre-packaged container 11 and the injector element 20 are configured as distinct parts that can be coupled together. In possible variant embodiments (not represented), the container 11 may already be provided with a corresponding injector element, for example pre-mounted. In what follows, for reasons of simplicity, the element 20 will be identified as "nozzle".

Figure 2:
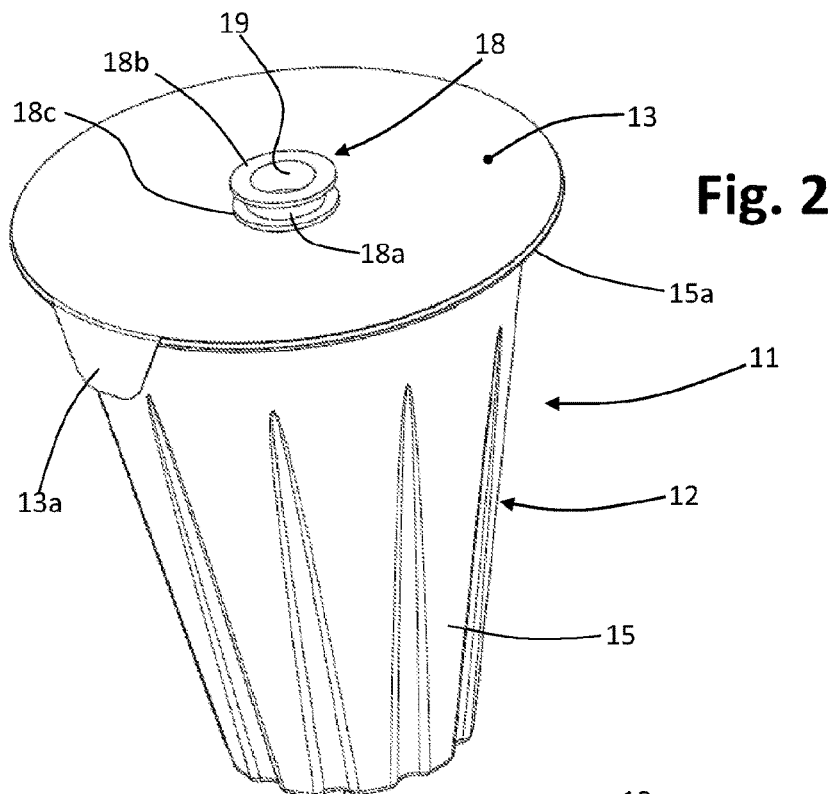
FIGS. 2 and 3 are schematic views, respectively a perspective view and a cross-sectional view, of a sealed container according to possible embodiments of the invention.
Figure 3:
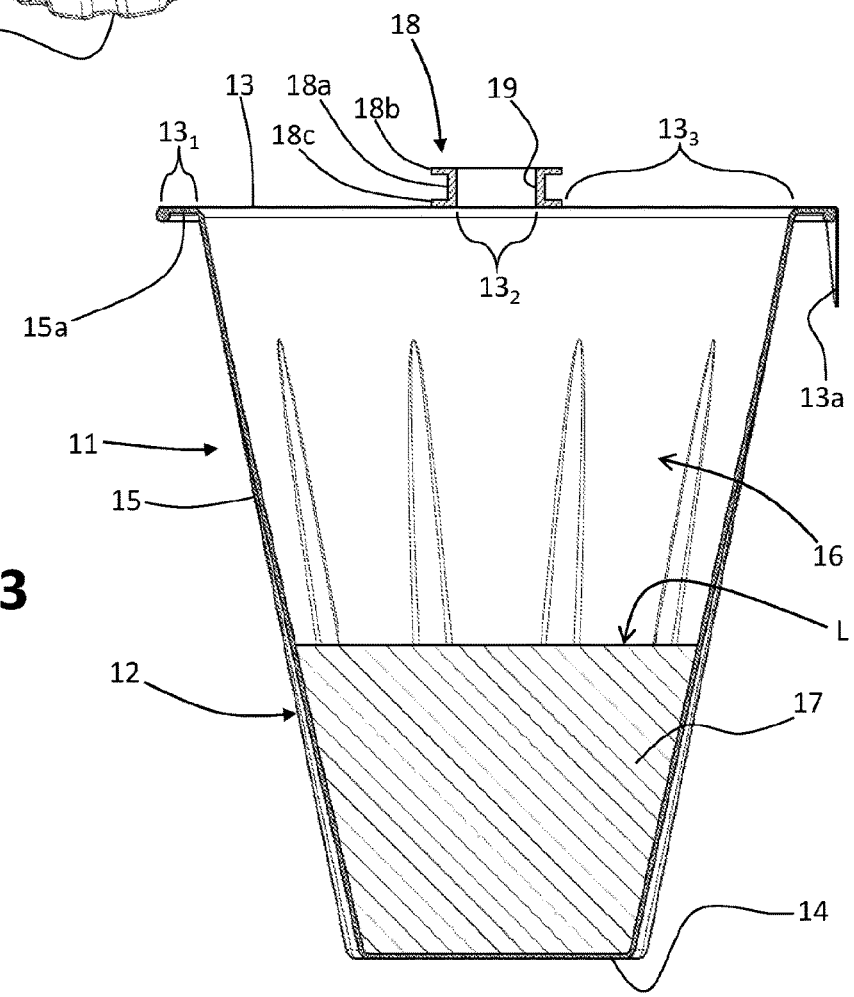

As may be seen in FIGS. 2 and 3, in various embodiments, the sealed container 11 has a container body 12, closed at the top by a top or entry wall 13 and having a bottom wall 14 and a lateral wall 15. The walls 13, 14, and 15 define a chamber or sealed internal volume 16, containing a predetermined amount of at least one food substance 17, in particular a first ingredient of the food product to be prepared, possibly an ingredient of a perishable type and/or a type that can be kept in a refrigerated environment. In what follows, it may be assumed for reasons of simplicity that the aforesaid food product to be prepared is a hot cappuccino, the substance or ingredient 17 of which contained in the chamber 16 is fresh cow's milk, and the preparation fluid that can be supplied by the machine 1 into the container 11 is steam. It should be noted that, as an alternative, a pre-packaged sealed container according to the invention could include milk of some other nature, for example, selected from the following: UHT milk, milk without lactose, goat's milk, soy milk, hazelnut milk, milk-based preparation (fruit and/or chocolate).

The bottom wall 14 and the lateral wall 15 of the container body 12 are preferentially made of a single piece, preferably with a plastic material suitable for food purposes, for example a moulded or thermoformed body made of polypropylene or polystyrene, or of a bio-plastic or compostable material. Not on the other hand excluded from the scope of the invention is the case where the container body 12 is made of a metal material or a material with a metal base, for example aluminium. The lateral wall 15 is preferably substantially frustoconical, and the bottom wall 14 is substantially plane, but these shapes are not essential.

The top wall 13 of the container body 12 preferentially comprises a sealing foil, preferably of a pierceable type, for example made of plastic material (e.g., a polypropylene-based material, or a bio-plastic, or a compostable material) or of metal material (for example, an aluminium-based material), or possibly comprising a number of layers that may even made of different materials (for example, a number of films of plastic material, or a number of films of metal material, or combinations of at least one film of plastic material, and at least one film of metal material).

The foil 13 that forms the top wall of the container body 12 has a peripheral region 13₁ (FIG. 3), which is fixed in a hermetically sealed way at an upper edge of the lateral wall 15. For this purpose, preferentially this upper edge is shaped so as to define an annular flange 15a, which extends radially outwards from the lateral wall 15. The peripheral region 13₁ of the foil 13 can be fixed in a sealed way to the upper surface of the flange 15a via heat-sealing.

Irrespective of the specific materials used for production of the body 12 and of the wall 13, they are preferentially materials that have barrier properties in regard to oxygen and light, adequate to enable a sufficiently prolonged conservation of the corresponding contents, here represented by the liquid milk 17, also in a refrigerated environment.

Preferentially, the foil 13 is configured for being removed from the container body 12, in particular in order to enable consumption of the cappuccino directly from the container body 12 itself, in the form of a cup. For this purpose, in various embodiments, the foil 13 defines a gripping tab or appendage, designated by 13a, aimed at facilitating manual peeling away of the foil itself from the flange 15a. In various preferential embodiments, in order to enable drinking of the food product directly from a container body 12, i.e., with the consumer who brings a flange 15a to his or her lips, the profile or outer edge of the flange 15a is preferentially generally rounded, or in any case shaped so as to prevent the presence of sharp edges. In the case exemplified, the flange 15a is purposely provided with a rounded edge, designated by 15b only in FIG. 24. As has been said, the container 11 is preferably prearranged to enable preparation of the food product via the machine 1 and retention of the product inside it, in particular in view of its subsequent consumption.

In various embodiments, in a position corresponding to the top or inlet wall, the container 11 has at least one coupling or positioning element, which is preferably axially hollow and defines at least part of an inlet of the container itself.

In the example of embodiment illustrated, the aforesaid at least one coupling or positioning element is associated to the foil 13 and is designated as a whole by 18. The element 18 is preferably located at a region of the foil 13 that is radially more internal with respect to the peripheral region 13₁. Preferentially, the coupling or positioning element 18 projects outside the sealed chamber 16 and defines an axial cavity 19. The element 18, hereinafter identified for reasons of simplicity as "matching part", may be made of plastic material, for example polypropylene, or a bio-plastic, or a compostable material, and may be fixed to the foil 13, for example via gluing or heat-sealing, preferably but not necessarily on the outer surface of the foil 13. The matching part 18 is preferentially associated to the foil 13 in a substantially central position of the latter, even though this does not constitute an essential characteristic.

In various preferential embodiments, the matching part 18 identifies, at the corresponding axial cavity 19, a first piercing region of the foil 13, designated by 13₂, and/or a passage for guided introduction into the inner chamber 16 of the container 11 of a first distal portion of the nozzle 20. As will emerge clearly hereinafter, in various embodiments, this introduction is aimed at enabling supply, within the chamber 16 of the container 11, of a preparation fluid, in particular pressurized steam, generated in the machine 1. For this purpose, the machine 1 is provided with an external element for dispensing the steam, which, in some preferential embodiments, comprises a purposely provided external dispensing head. In other embodiments, the element used for dispensing the steam into the nozzle 20 could be an external wand of the machine 1. The dispensing element and the dispensing head are here defined as "external" in so far as at least one of them at least in part faces the outside of the structure or casing 2 of the machine 1; i.e., it is accessible from outside in order to enable coupling thereof with the container 1.

In other embodiments (not represented), the nozzle 20 may be formed integrally with the matching part 18 or fixed thereto so as to project towards the inner chamber 16 of the container 11 right from production thereof, in particular at the moment of fixing of the foil 13 to the container body 12, after the amount of milk 17 has been dosed into the body 12.

In addition or as an alternative, in various embodiments, the matching part 18 is configured for identifying a predetermined position for the container 11 within the positioning space 5, with respect to a coupling arrangement of the preparation machine 1, as exemplified hereinafter.

In various preferential embodiments, the matching part 18 is substantially shaped like a cylindrical bushing, with the corresponding axial cavity 19 having a circular section. More in general, the profile of the cavity 19 is substantially congruent with or at least approximately complementary to an outer profile of the tubular element 21.

In various embodiments, at least one of the matching part 18 and the nozzle 20 is shaped for mechanical coupling with the aforementioned steam-dispensing element of the machine 1, in particular the aforesaid dispensing head.

For this purpose, in the non-limiting case exemplified in the figures, the matching part 18 is shaped so as to present a groove or recess 18a in an intermediate position between its two axial ends. Once again preferably, these two axial ends are shaped so as to define an upper flange 18b and a lower flange 18c, respectively, between which the groove 18a, here having a circular profile, extends. In various embodiments, such as the one exemplified in the figures, the upper end of the matching part 18, i.e., its flange 18b, defines an abutment surface for a corresponding surface of the nozzle 20, whereas the lower end, i.e., the flange 18c, defines a surface for fixing of the matching part 18 to the foil 13, as has been said, for example, via gluing or heat-sealing.

It should be noted that, in possible embodiments alternative to the one exemplified in the figures, at least part of the functions indicated for the matching part 18 could be integrated in a purposely shaped nozzle 20.

Figure 4:
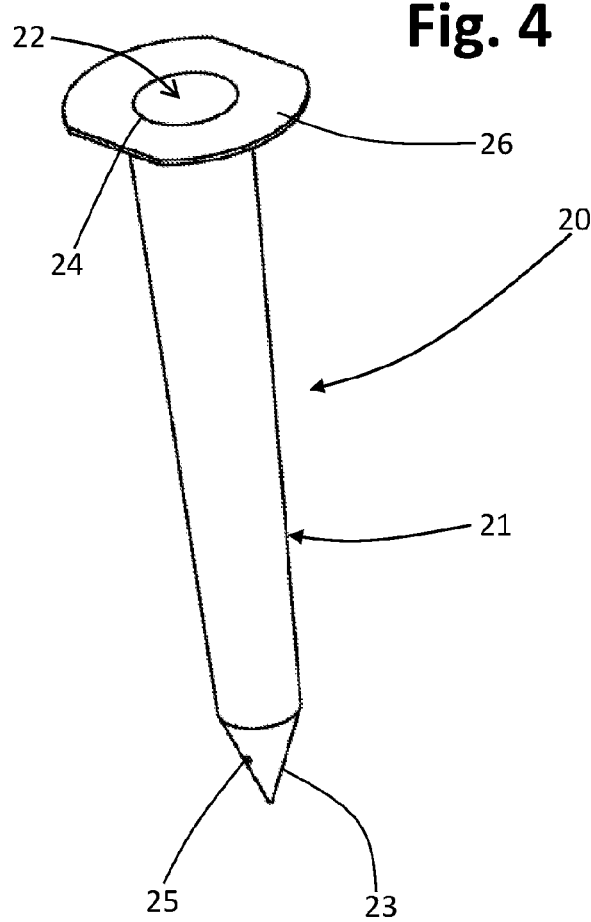
FIGS. 4 and 5 are schematic views, respectively a perspective view and a cross-sectional view, of a tubular injector element of a disposable container according to possible embodiments of the invention.
Figure 5:
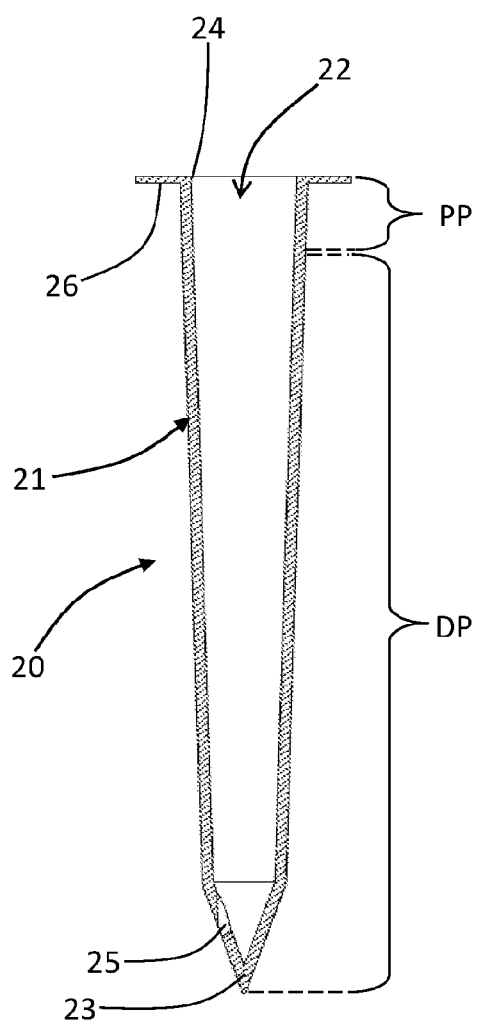

As may be seen in FIGS. 4 and 5, in various embodiments, the nozzle 20 has an axially extending tubular body 21, preferentially having a circular section or, as in the case exemplified, at least a slightly frustoconical section, defining a cavity or internal duct 22. In various preferential embodiments, the lower part of the nozzle 20, or of its body 21, is closed and shaped so as to facilitate piercing or tearing of the foil 13 in the region 13₂ (FIG. 3). In order to facilitate piercing, the foil 13 can possibly be pre-cut or weakened at the region 13₂, without prejudice to its characteristics of hermetic sealing with respect to the container body 12.

Figure 7:
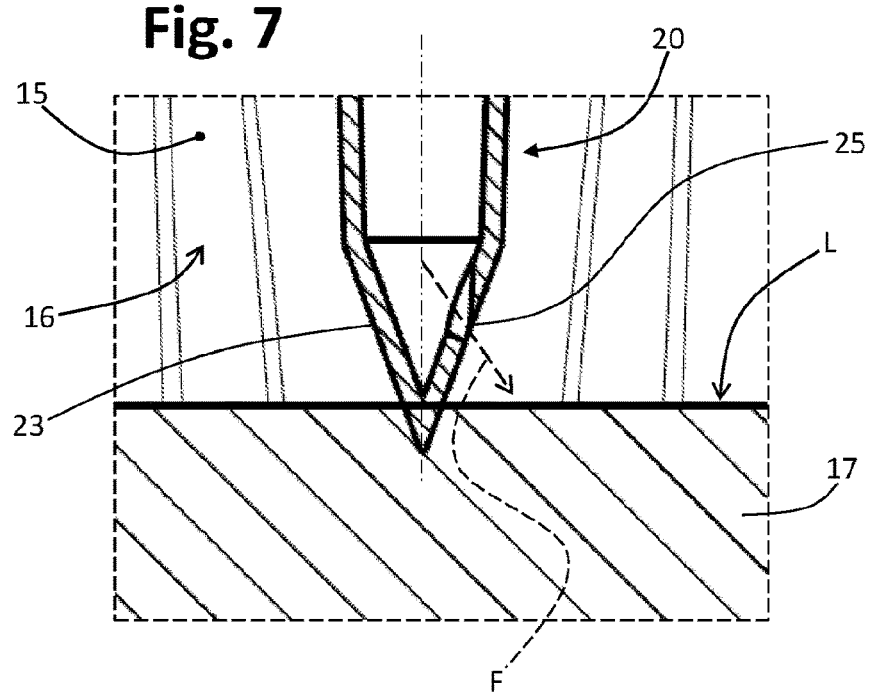
FIG. 7 is a detail of FIG. 6 at a larger scale.

In the case exemplified, the aforesaid lower end of the tubular body 21, designated by 23, is shaped so as to define a tip, preferably but not necessarily having a substantially conical shape. The body 21 defines at its own upper end an inlet 24 of the internal duct 22, the duct having at least one outlet, which is preferentially located in a position of the body 21 that is intermediate between its two axial ends, in particular at the peripheral wall of the aforesaid tip. In the case of FIG. 7, the body 21 includes a single outlet, designated by 25, but in other embodiments two or more outlets 25 may be provided, for example two outlets 25 in opposite positions, or else more than two outlets 25 distributed along a circumference of the body 21, for example three outlets 25 at 120° apart from one another. Provision of a number of outlets 25 may be useful for reasons of balancing.

In various preferential embodiments, the matching part 18 and the nozzle 20 are prearranged in such a way as to define a position of maximum insertion of the aforementioned first distal portion of the nozzle in the chamber 16 of the container 11. For this purpose, preferentially the nozzle 20 has arrest or end-of-travel means, which are able to co-operate with the matching part 18 to define the position of maximum insertion. In various embodiments, the aforesaid arrest or end-of-travel means comprise at least one lateral projection 26 of the body 21 of the nozzle 20, the projection being preferentially a flange defined substantially at the proximal end of the body 21, or of the inlet 24 of its internal duct 22.

In other embodiments, different arrest means may be provided, for example determined by the shape and size in cross-sectional view of the nozzle 20 and of the axial cavity 19 of the matching part 18. In an embodiment of this type, it is possible to exploit, for example, the generally frusto-conical outer shape of the nozzle 20, which, at a certain point of its insertion, will interfere mechanically with the diametral profile of the cavity 19, thus stopping insertion. It will hence be appreciated that, in embodiments of this type, the flange 26 of the nozzle 20 can be omitted, or does not necessarily have to come to bear upon the matching part 18.

With reference to the case exemplified, as may be appreciated, the nozzle 20 can be inserted manually through the cavity 19 of the matching part 18, so that the tip end 23 will cause piercing of the foil 13 in the region 13₂. Insertion of the nozzle 20 proceeds until its flange 26 comes to bear upon the upper end of the matching part 18, i.e., on its flange 18b, thus identifying the aforesaid position of maximum insertion. This condition is exemplified in FIG. 6. As has just been mentioned, this position can also be determined by the interference between the outer profile of the nozzle 20 and the inner profile of the cavity 19.

The axial cavity 19 of the matching part 18 enables guiding of the movement of insertion of the nozzle 20. The preferably frustoconical section of the body 21 of the nozzle 20 advantageously enables a sort of self-centring of the body itself within the cylindrical cavity 19 of the matching part 18.

Figure 6:
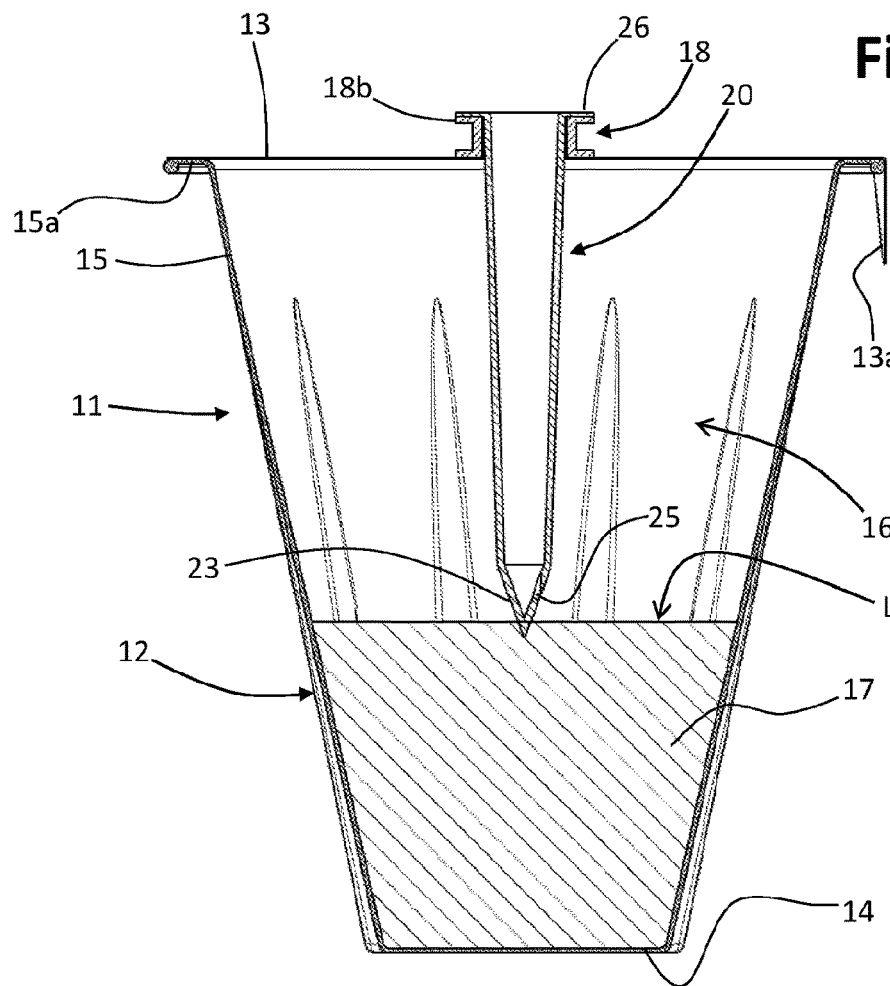
FIG. 6 a schematic cross-sectional view of a disposable container according to possible embodiments of the invention.

The aforesaid first distal portion of the nozzle 20, i.e., the portion thereof that is to protrude into the chamber 16 of the container 11, is designated by DP in FIG. 5; in the same figure, denoted by PP is, instead, a second proximal portion of the nozzle 20, which—in the aforesaid position of maximum insertion—is to remain outside the chamber 16, this portion substantially comprising the stretch of the body 21 that traverses the cavity 19 of the matching part 18, as well as the corresponding upper flange 26, which in this case bears upon the upper flange 18b of the matching part 18, as may be seen in FIG. 6. As will be seen, in various embodiments, in the aforesaid condition of maximum insertion, the flange 26 of the nozzle 20 and the matching part 18 form substantially an inlet of the container 11, which may be mechanically coupled in a sealed way to the aforesaid dispensing head of the preparation machine 1.

As exemplified in FIG. 6, in various embodiments, in the position of maximum insertion of the nozzle 20 (meaning thereby its operative position, even in the case of a nozzle pre-mounted or made of a single piece with the matching part 18), its lower or distal end is raised with respect to the bottom wall 14 of the container body 12, at a substantially preset distance therefrom. In various preferential embodiments, in the position of maximum insertion of the first distal portion DP (FIG. 5) of the nozzle 20 into the chamber 16 of the container 11, the outlet opening 25 of the nozzle 20 itself is located at a substantially preset distance above the level (in static conditions) of the first ingredient 17, here represented by liquid fresh milk. Also this characteristic may be appreciated from FIG. 6, as well as from the corresponding detail of FIG. 7, where the level of the milk 17 is designated by L. In general terms, the distance between the at least one outlet 25 of the nozzle 20 and the level of the food substance 17 may depend upon the type of the substance itself and/or upon the type of food product to be prepared, and/or upon the volume of the chamber 16, and/or upon the amount of the desired food product, and/or upon the type of preparation. In other embodiments, on the other hand, a position that is correct from a functional standpoint for the at least one outlet 25 of the nozzle may can also be at a height lower than the level of the food substance 17; i.e., the outlet 25 is at least partially submerged.

In the case exemplified, the outlet 25 is defined at the terminal tip portion 23 of the injector element 20, in particular in its conical wall: more in general, it is preferable for the at least one outlet 25 to be shaped and/or positioned in such a way that the pressurized fluid supplied in the duct 22—the steam, in the example considered here—comes out of the outlet 25 with a flow having a direction generally inclined with respect to the axis of the nozzle 20 and/or with respect to the surface of the mass of milk 17, as highlighted by the arrow F in FIG. 7. This inclined arrangement of the flow may be advantageous in order to generate swirling motions in the mass of milk 17, useful for facilitating formation of an abundant surface froth.

It will moreover be appreciated that, given the presence of the nozzle 20 and of its outlet 25, the preparation fluid can be introduced into the chamber 16 in an area that is at a distance from the entry wall, here represented by the foil 13.

Figure 8:
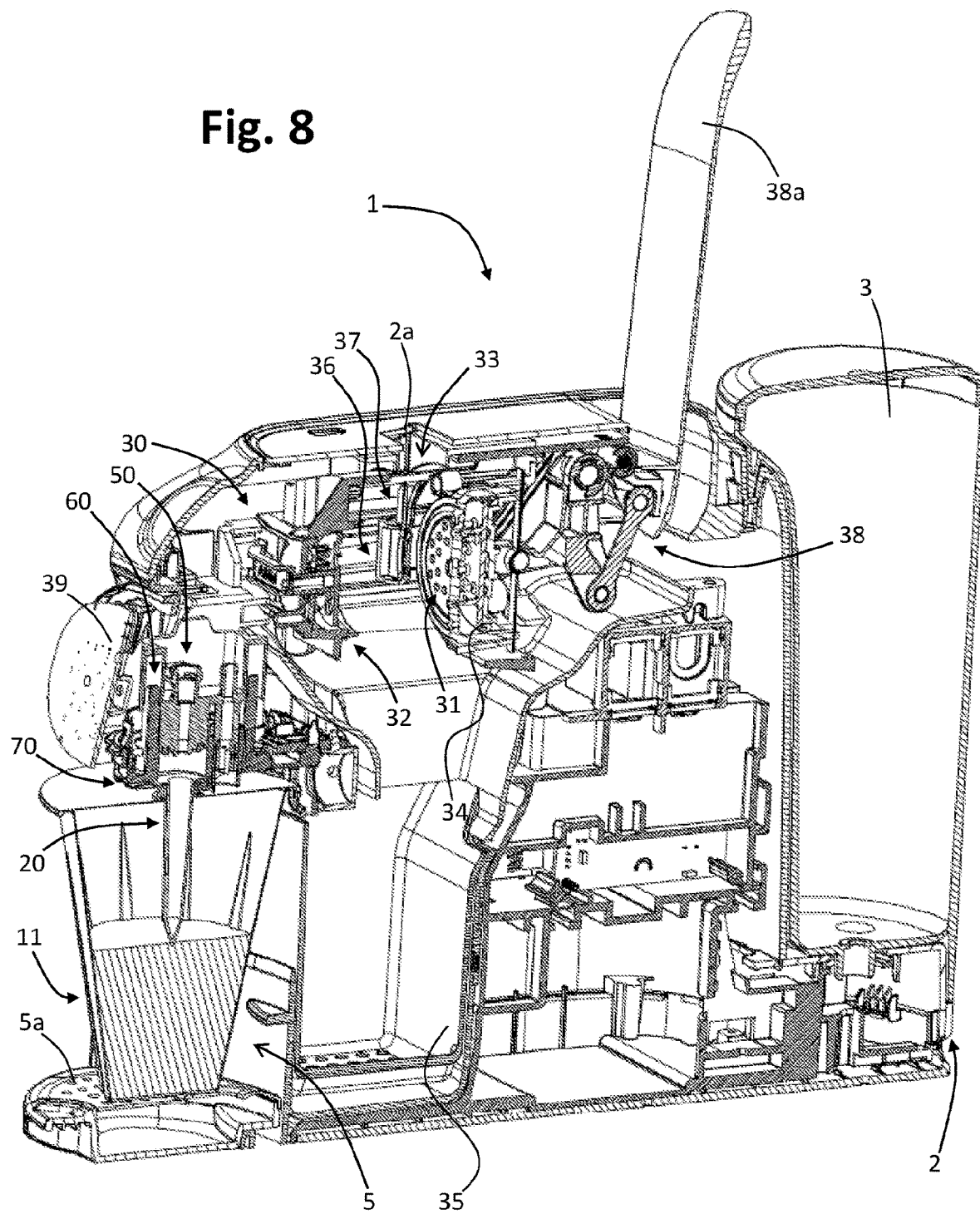
FIG. 8 is a partial, schematic cross-sectional view of a preparation machine according to possible embodiments of the invention, in a first condition.
Figure 9:
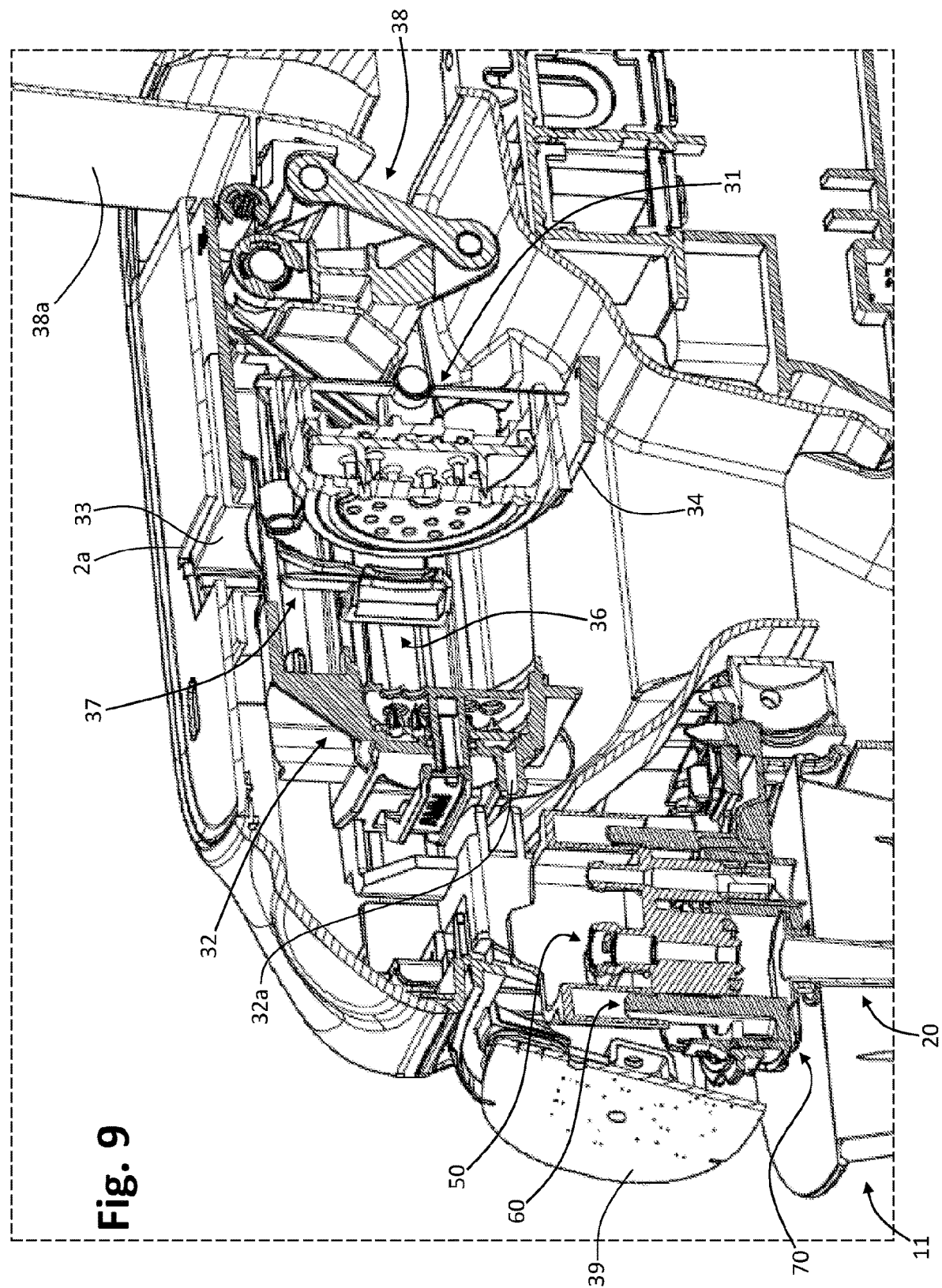
FIG. 9 is a detail of FIG. 8 at a larger scale.

In FIG. 8, and in the corresponding detail of FIG. 9, a machine 1 according to possible embodiments of the invention is represented in a partial and schematic form merely by way of non-limiting example. The machine 1 is here illustrated limitedly to the parts of immediate interest for an understanding of the invention, amongst which a preparation or brewing unit, designated as a whole by 30.

From a mechanical standpoint, the brewing unit 30 may be of any known type available in the sector, for example—but not exclusively—as described in one or more of the documents WO 2014/016741 A2, WO 2013/182923 A1, WO 2013/150480 A1, WO 2013/140282 A1, WO 2013/111088 A1, WO 2013/038318 A1, WO 2012/168917 A1, WO2012168918 A1, all of which are filed in the name of Luigi Lavazza S.p.A., to which the reader is referred also for a description of possible types of capsules (either sealed or not) that can be used in machines according to the present invention. It should on the other hand be noted that the invention may be applied also to machines that use pods made of paper material, or else in machines, the brewing chamber of which is designed for receiving directly a precursor of a liquid product, without the mediation of a capsule or pod, such as a preparation in granular or powdered form, for example ground coffee, or else compacted in the form of a tablet. Again, the invention may be applied to dispensing units that have a brewing chamber defined by one or more stationary bodies, within which the precursor of a liquid product can be supplied through a suitable passage, and can then be re-closed in a sealed way. The ground coffee supplied to the brewing chamber could also be generated in the machine 1 itself, if the latter is provided with a bean-to-cup system, i.e., a system—in itself known—prearranged at least for:
  i) directly grinding coffee beans contained in a hopper container that equips the machine;
  ii) dosing the amount of ground coffee necessary for a preparation in progress; and
  iii) delivering the dose of ground coffee to the brewing chamber.

As already mentioned, in various preferential embodiments, the unit 30 comprises a brewing chamber, configured for receiving at least one dose of at least one precursor of a liquid food product and for dispensing the product following upon the passage of water and/or steam through the brewing chamber and the precursor. For this purpose, the machine 1 is also provided with a hydraulic circuit, configured for supplying pressurized hot water and/or steam to the brewing chamber.

In various embodiments, the brewing chamber comprises a first part and a second part, at least one of which is displaceable relative to the other, between a spaced-apart or open position, to enable loading of the aforesaid dose of precursor into the brewing chamber, and a close or closed position, to enable introduction of water and/or steam into the brewing chamber, and consequent dispensing of the liquid food product. As mentioned, on the other hand, the invention may also be applied to the case of units with a brewing chamber defined by one or more stationary bodies.

In various embodiments, the first part of chamber, designated by 31, comprises an injector device, referred to hereinafter for reasons of simplicity as "injector", designed to introduce pressurized hot water and/or steam into the brewing chamber. The injector 31 is supplied by a corresponding duct (not represented) via a source of water (here represented by the tank 3), pumping means, and a boiler (not represented in FIGS. 8-9). The second part of the brewing chamber, designated by 32, comprises a body defining a hollow volume suitable for receiving the aforesaid dose of precursor and designed to dispense the liquid product obtained starting from the precursor; for this purpose, to the part 32 there can operatively be associated a dispensing duct, an initial part of which is designated by 32a in FIG. 9, for release of the liquid product from the brewing chamber.

In a preferred embodiment, such as the one represented, the unit 30 is of the type prearranged for receiving capsules containing the aforesaid dose of precursor: in such an embodiment, the part of chamber 32 is hence a capsule-holder, designed to house a capsule at least partially.

Figure 10:
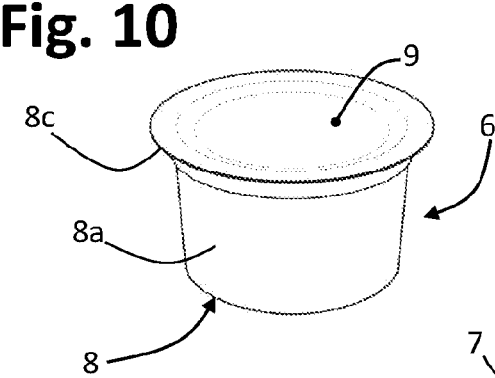
FIGS. 10 and 11 are schematic views, respectively a perspective view and a cross-sectional view, of a capsule for preparing liquid food products that can be used in a system or in a machine according to possible embodiments of the invention.
Figure 11:
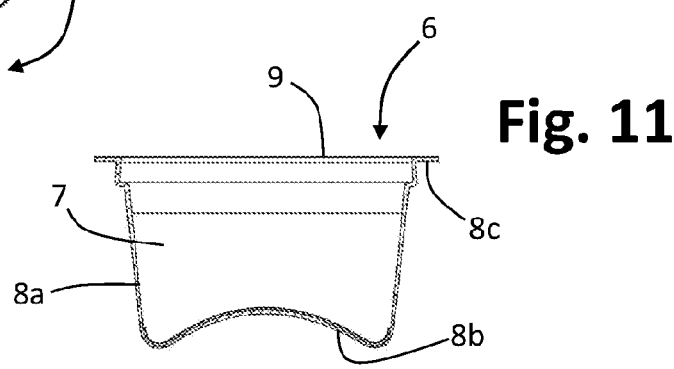

FIGS. 10 and 11 illustrate, merely by way of example, a capsule 6 (or cartridge or pod, according to other terms currently in use) that can be used in the machine 1 in order to supply to the container 11 a second liquid ingredient of the food product: with reference to the example mentioned previously, where the product is a cappuccino, it is to be assumed that the precursor contained in the capsule 6 is ground coffee suitable for preparing an espresso coffee.

The capsule 6 may be of any type in itself known, and is described herein only for the purposes of a more convenient understanding of possible embodiments of the invention. On the other hand, as mentioned, in possible variant embodiments, the brewing unit 30 of a machine according to the invention may be of the type that does not involve the use of capsules for the purposes of preparation of liquid food products.

The capsule 6 contains a dose 7 of at least one precursor that is able to produce a liquid food product or substance using water and/or steam. In general, the dose 7 may be constituted, as in the example, by ground coffee, or else by another precursor of a liquid product, such as tea, chocolate, some other beverage, or a lyophilized preparation for preparing broth, soups, and infusions of various nature. This list is to be understood as being provided as an example and does not have a mandatory nature, and the precursor could also be of a liquid type. In what follows, as has been said, reference will be made to the preparation of espresso coffee, with the dose 7 that is hence understood as being constituted by ground coffee for brewing.

In the structure of the capsule 6, which is as a whole shaped substantially like a tray or small cup in which there is the dose 7, it is possible to distinguish:
  a body 8, comprising a lateral or peripheral wall 8a and a bottom wall 8b that closes the body 8 at one end of the lateral wall 8a; and
  a closing wall 9, which closes the capsule 6 at the end opposite to the bottom wall 8b.

In the example illustrated, the capsule 6 is a hermetically closed capsule, with the wall 9 that is constituted by a sealing lamina. The body of the capsule 6 is generally semi-rigid, for example with at least one plastic-based material (e.g., with a polypropylene-based material, or a bio-plastic, or a compostable material) and/or at least one metal material (for example, an aluminium-based material). The wall 9 is made of a flexible-foil material, consisting of plastic material or metal material, possibly also of a multi-layered type comprising different materials (for example, either a plastic material or a metal material). The invention may, however, also be used in combination with capsules made of other materials and/or capsules that have the bottom wall and/or the closing wall provided with holes.

In the example, the wall or lamina 9 is connected, in a sealed way, for example by heat-sealing, to the lateral wall 8a of the body 8 of the capsule, in particular at an outer annular flange 8c thereof, which surrounds the mouth part of the body 8: in the example, the capsule 6 hence has an asymmetrical shape, with respect to a plane passing through the flange 8c.

In the case exemplified, the body 8 is shaped like a cup or tray diverging from the bottom wall 8b towards the end closed by the sealing lamina 9. Preferentially, this divergent conformation is a frustoconical conformation, which is, however, not imperative, in so far as the capsules 6 may have shapes that are as a whole different, for example a cylindrical, a prismatic shape, a frusto-pyramidal shape, a cubic shape, or a parallelepipedal shape, etc. In the non-limiting example represented, the bottom wall 8b is shaped like a concave vault, with the concavity of the vault of the capsule 6 directed outwards: also in this case, the choice of this conformation does not have an imperative nature, in so far as the capsule 6 could, for example, have a bottom wall 8b shaped like a vault with its concavity facing the inside of the capsule 10, or else a plane or substantially plane bottom wall 8b.

To return to the non-limiting example of FIGS. 8 and 9, the capsule-holder 32 is substantially coaxial to the injector 31, and is mounted in a stationary position with respect to the structure, whereas the injector 31 is mounted in a movable way. According to embodiments (not represented), the injector 31 may, instead, be stationary, and the movable capsule-holder, or else both the injector and the capsule-holder, may be movable in order to obtain passage between the spaced-apart position and the close position. In possible variant embodiments (not illustrated), the function of injection of water and/or steam into the chamber formed by the union between the two parts 31 and 32 may be carried out in the second part 32, and the function of dispensing of the espresso coffee may be carried out in the first part 31, or else again one and the same part of the brewing chamber may be prearranged for the purposes of injection of water and/or steam and of dispensing of the espresso coffee.

In various embodiments, the unit 30 includes an arrangement for loading and unloading the capsules 6, which comprises an inlet passage and an outlet passage, designated by 33 and 34, for example defined in an upper wall and a lower wall of a casing of the unit 30, respectively. In the example, the inlet passage 33 is defined in a wall of the unit 30 that is movable with the injector 31 and is aligned at the bottom to a similar inlet passage 2a defined in the structure 2 of the machine 1 when the injector 31 is in its position set at a distance from the capsule holder 32. Underneath the outlet passage 34 of the unit 30 there is preferably provided a container 35 for collection of the spent capsules. It should be noted that in FIGS. 8-9 and in the similar FIGS. 12-23, the capsules 6 have not been represented for reasons of clarity.

The loading and unloading arrangement of the machine 1 preferentially includes retention means, which can temporarily withhold a capsule 6 in a position intermediate between the injector 31 and the capsule holder 32 when these are in their spaced-apart position, and then release the capsule itself for its insertion into the capsule holder 32, when the injector and the capsule holder are brought into the close position. Passage between the condition of retention and the condition of release may for example be obtained by means of a relative movement between the capsule holder 32 and the injector 31, or else by way of an expeller member associated to the capsule holder, all of which according to a technique in itself known (see, for example, the aforementioned documents filed in the name of Luigi Lavazza S.p.A.) Preferentially, the retention means 36 are arranged within the casing of the unit 30, in a position intermediate between the inlet passage 33 and the outlet passage 34, to be operative between the injector 31 and the capsule holder 32 when these are in the respective spaced-apart position, as represented in FIGS. 8 and 9.

In various embodiments, the aforesaid retention means comprise at least two opposed retention elements 36, just one of which may be seen in FIGS. 8-9, the two elements being preferentially mounted substantially symmetrically and in one and the same plane transverse to the axis of operation of the unit 30, or of displacement of the injector 31.

The elements 36 may for example be constituted by two movable jaws or shoulders, possibly provided with elastic means arranged for pushing the jaws or shoulders towards a position of equilibrium, or for retention of a capsule 6. The elements 36 may be shaped so as to define between them at least one seat such that, in the course of the step of loading from above, a portion of the capsule 6 penetrates between the elements 36 themselves, causing divarication thereof, countering the action of the corresponding elastic means, until the aforesaid seat is reached. In this condition, the capsule 6 is withheld by the elements 36 in the intermediate position that is substantially coaxial to the injector 31 and to the capsule holder 32.

In other embodiments, the elements 36 may be prearranged so that the retention position is reached and maintained by the capsule 6 in the absence of an elastic stress on the elements 36: in such a case, the presence of possible elastic means and/or the intrinsic elasticity of the material constituting the elements 36 is exploited to enable divarication thereof and subsequent return to the position of equilibrium.

The body of each element 36 can also be shaped so as to interact with parts of the injector 31 in order to obtain a divarication or switching of the elements 36: for this purpose, for example, the body of the elements 36 may be provided with corresponding lead-ins or inclined planes, or present projections designed to co-operate with corresponding parts, such as lead-ins or inclined planes, present on the injector 31.

In any case, the retention means of the unit 30 can also have a conformation different from the ones mentioned above, without prejudice to the general function of temporarily retaining a capsule 6 in a position intermediate between the capsule holder 32 and the injector 31. For instance, the retention elements 36 may be switchable shoulders of the type described in WO 2008/142663 A2, or else may include stationary guide elements that can be engaged by the flange 8c of a capsule 6 and are designed to sustain the latter in the aforesaid intermediate position: after the capsule has been pushed by the movable injector 31 into the capsule holder 32, the possibility of deformation of the aforesaid flange 8c is exploited in order to release it from the aforesaid guide elements.

In other embodiments, the retention means could be carried directly by the capsule holder 32 or by the injector 31, for example in the form of projecting jaws or arms, designed to divaricate following upon interaction with the body of the injector 31 or of the capsule holder 32, respectively. In other embodiments still, such as the one represented, the retention means 36 may be movable with the injector 31 so that, after a capsule 6 has been taken up between them, to the passage of the injector 31 towards the close position with respect to the capsule holder 32 there corresponds a similar movement of the means 36, such as to cause passage of the capsule 6 into the capsule holder 32.

It should be noted that, in the retention position, the axis of the capsule 6 could also be slightly inclined: in such a variant embodiment, the conicity of the peripheral wall of the capsule 6 and of the housing defined in the capsule holder 32 may be exploited to obtain a relative movement of centring between the elements in question, in the course of advance of the capsule towards the capsule holder (or of advance of the capsule holder towards the capsule, in the case where the capsule holder is movable). It must on the other hand be emphasised that the presence of the retention means does not constitute an essential element of the invention, it being possible for these means to be absent (for example, in the case of units with roto-translational movement, such as the ones described in the aforementioned documents WO 2013/182923 A1 and WO 2013/038318 A1).

Preferentially, the profile of at least one of the inlet passages 2a and 33 substantially corresponds to the cross section of the capsule 6 so as to enable a guided introduction thereof, with fair precision, into the unit 30. In this perspective, for example, the passages 2a and 33 can define opposite guide grooves for the projecting flange 8c of the capsule 6.

During loading, after the capsule 6 has passed beyond the aforesaid passages 2a and 33, it is taken up by the retention means 36. The unit 30 may also include, downstream of the passage 33, two opposite linear guides, one of which represented schematically in FIGS. 8-9, where it is designated by 37, for guiding the capsule towards the retention means 36. These guides 37 may, for example, be configured for receiving between them the flange of the capsule 6.

In the embodiment exemplified, the injector 31 can be displaced in two opposite directions along a substantially horizontal axis of operation, via a lever-type mechanical actuation system, designated as a whole by 38, of any type known in the sector. The system 38 may for example be actuated by a lever that can be operated manually by a user of the machine 1, such as the lever designated by 38a. In other embodiments (not represented), however, the actuation system may be of a motor-driven type, i.e., comprising at least one controllable actuator, such as an electric actuator or else a fluid actuator.

Figure 12:
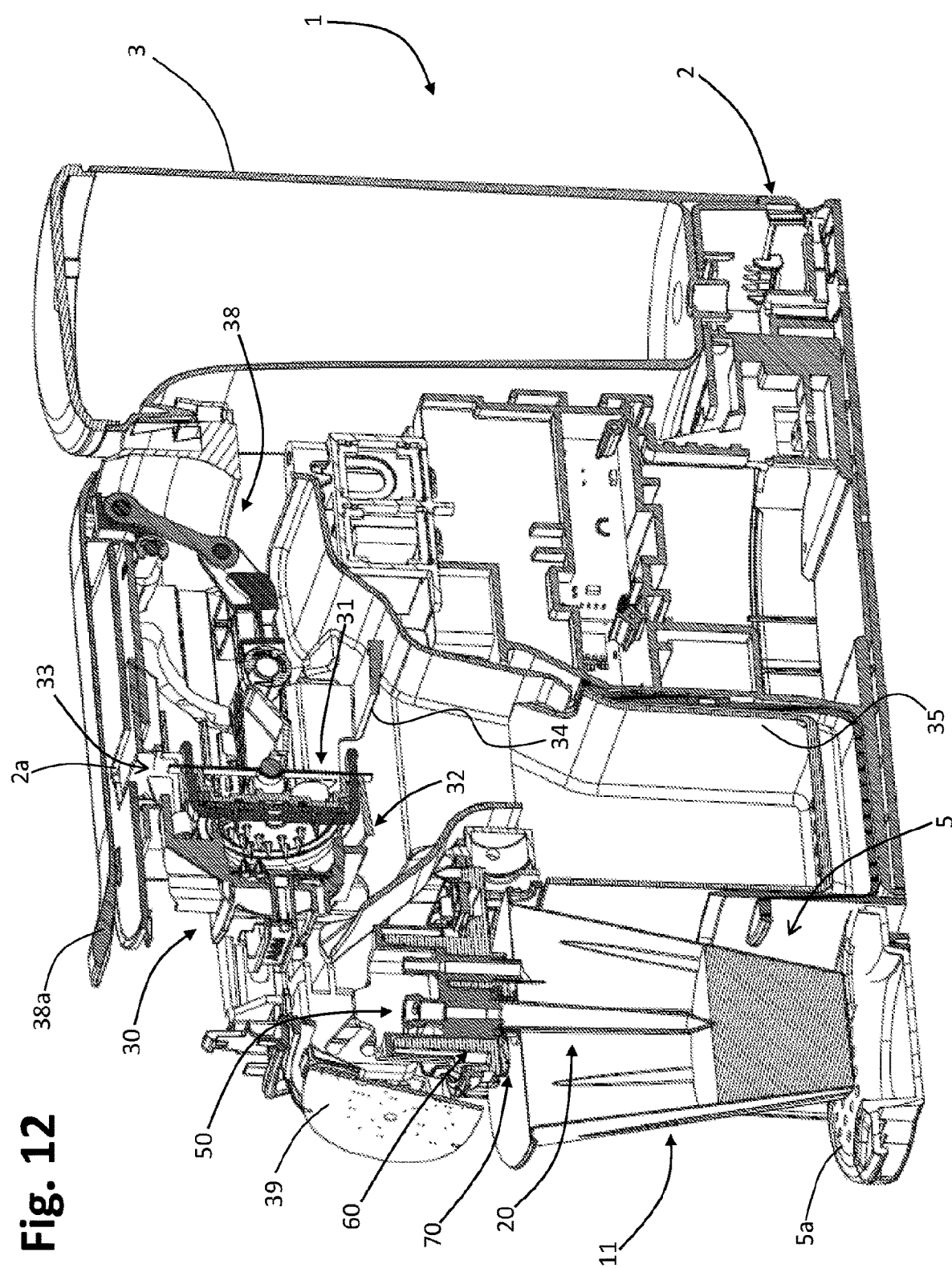

Starting from the retracted position of the injector 31 (visible in FIGS. 8-9), lowering of the lever 38a causes, via the actuation system 38, advance of the injector 31 towards the capsule holder 32, up to a position where they are close together (visible in FIGS. 12-13). In this step, as has been said, the capsule 6 previously inserted into the unit 30 and supported by the retention means 36 in a position intermediate between the injector 31 and the capsule holder 32 is displaced towards the inside of the latter. In the final position where the injector and the capsule holder are close together (see FIGS. 12-13), they define the brewing chamber, in which the capsule 6 is housed. The injector 31 and/or the capsule holder 32 may be provided with respective devices for piercing the capsule 6, comprising one or more tips or reliefs, according to known technique. As has been said, the invention may, however, be applied also to the case of brewing units for capsules having one or more pre-pierced end walls, or for capsules made of filter paper, or for brewing units for precursor tablets without a casing of their own, in which case it is not necessary to envisage a piercing device in the injector 31 and/or in the capsule holder 32. The capsule 6 may also be of the type in which one of its end walls can be opened as a result of the pressure that is created inside it following upon injection of the preparation fluid, in which case only the injector 31 may be provided with means for piercing the capsule.

In the condition where the injector and the capsule holder are close to one another, the preparation liquid—here hot water—is introduced into the brewing chamber so as to come into contact with the precursor—here ground coffee—, and the resulting food product—here espresso coffee—can come out through the corresponding outlet duct (32a in FIGS. 9 and 13). After dispensing, via raising of the lever 38a, it is possible to obtain a contrary displacement of the injector 31, i.e., a retraction thereof with respect to the capsule holder 32, into the respective position where they are set at a distance apart (FIGS. 8-9). In this step, the spent capsule 6 is extracted from the capsule holder (for example, via the retention means 36 themselves and/or with the aid of an expelling member associated to the capsule holder) and then falls by gravity through the outlet passage 34 of the unit 30, into the collection container 35.

The machine 1 comprises a hydraulic circuit, configured for supplying water and/or steam to the brewing chamber 30 and to at least one further dispensing element, in particular a dispensing element, which, for example, belongs to the aforementioned previously dispensing head, described hereinafter. As explained in what follows, this dispensing element is used for the purposes of introduction, into the internal volume 16 of the container 1, of a flow of pressurized hot water and/or steam, which is necessary for preparing the food product starting from the at least one food substance 17 contained in the volume itself.

Figure 14:
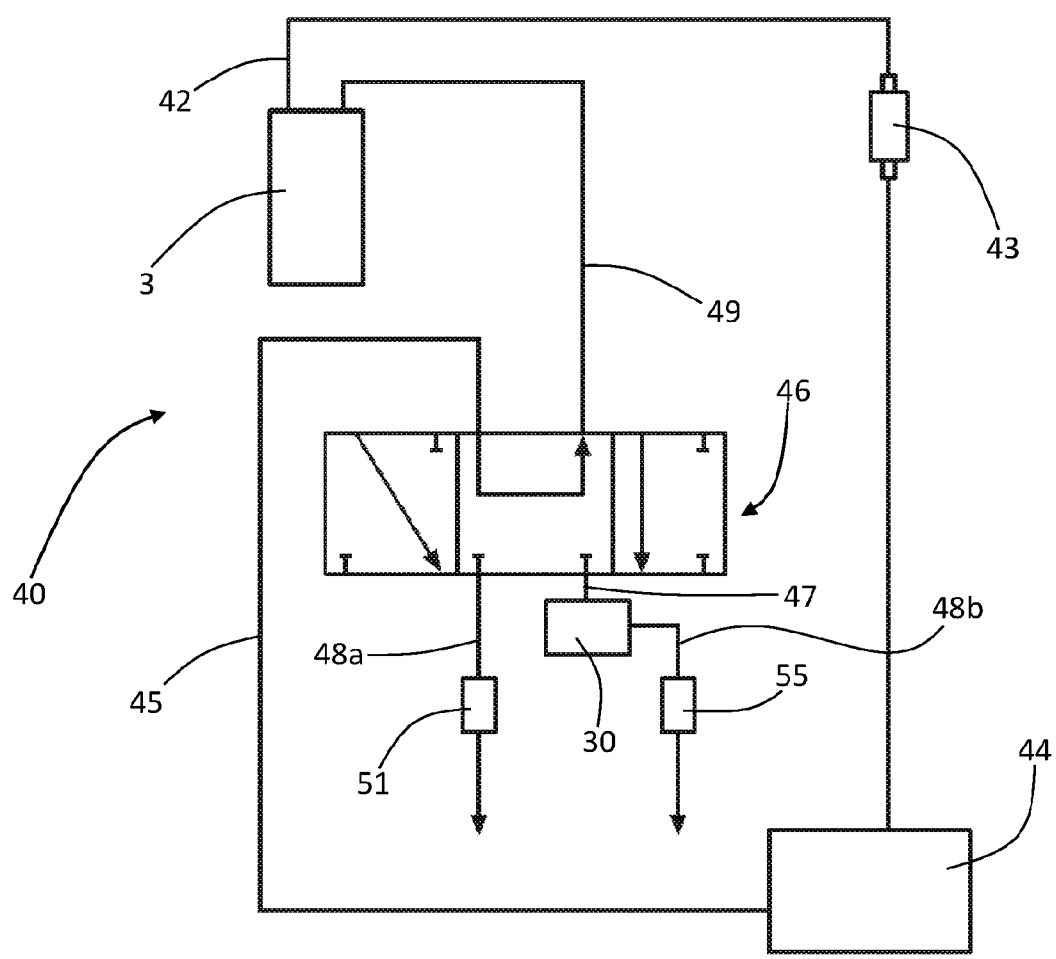
FIG. 14 is a diagram aimed at exemplifying a possible simplified example of hydraulic circuit of a preparation machine according to possible embodiments of the invention.

An example of hydraulic circuit is represented schematically in FIG. 14, where it is designated as a whole by 40. The circuit 40 comprises a series of sealed ducts in fluid communication with one another, not illustrated in FIGS. 8-9 and 12-13, but represented by a single line in FIG. 14.

As emerges from FIG. 14, in various embodiments the tank or source 3 has an outlet duct 42 operative on which is a pump 43, of a type in itself known, for example an electromagnetic pump. Via the duct 42 the tank 3 is connected to an inlet of a heater device 44, for example a boiler comprising an electrical resistance. The heater device 44 is configured for heating water forced by the pump 43 to pre-set temperatures. These temperatures—which comprise, for example, a temperature suitable for preparation of an espresso coffee and a temperature of vaporisation of the water—may be managed by the control system of the machine 1, in particular with the aid of a temperature sensor (not represented). The aforementioned control system, which preferably but not necessarily comprises an electronic microcontroller with associated memory means, can be implemented at least in part on an electronic board that equips the machine 1, such as the board designated by 39 in FIGS. 8-9 and 12-13.

An outlet of the heating device 44 is connected to a duct 45 for supplying pressurized hot water and/or steam to an inlet of a distributor or deviator device 46, for example provided with an actuator of its own that can be controlled by the control system of the machine 1. The device 46, when in a first operative position (towards the right, as viewed in FIG. 14) sets the duct 45 in communication with a duct 47 that supplies to the internal unit 30 the respective preparation fluid (hot water, in the example), for the production of espresso coffee via the capsule 6. When, instead, the device 46 is in a second operative position (to the left, as viewed in FIG. 14), the duct 45 is set in fluid communication with a duct 48a for supplying a respective preparation fluid (steam, in the example) to a respective external dispensing element, for instance belonging to the aforementioned dispensing head. The device 46 may possibly envisage an inoperative or resting position (at the centre, as illustrated in FIG. 14), in which the duct 45 is in fluid communication with a duct 49 for return of water into the tank 3.

Upstream of the chamber 30, in particular upstream of the injector 31, the circuit 40 preferentially comprises at least one non-return valve, designed to open only when the pressure of delivery of the water and/or of the steam downstream of the heater device 44 has reached a given value.

As already mentioned, in various embodiments, the machine 1 according to the invention comprises a dispensing head that is preferably mounted in a position overlying the positioning space 5 (FIG. 1), or facing the space 5 at least in part.

With reference to FIGS. 9, 13 and 15-16, in various preferential embodiments, the dispensing head comprises a movable part 50 and a stationary part 60 for guiding the movable part 50, with the stationary part that is preferably in a fixed position relative to the structure 2 of the machine 1 and that defines at least one seat or guide for guiding displacement of the movable part 50. Preferentially, the part 50 is displaceable in a substantially vertical direction between a raised or inoperative position and a lowered or operative position, with respect to the positioning space 5. The parts 50 and 60 may be made of metal material or else of plastic material, or else of combinations of such materials.

Figure 15:
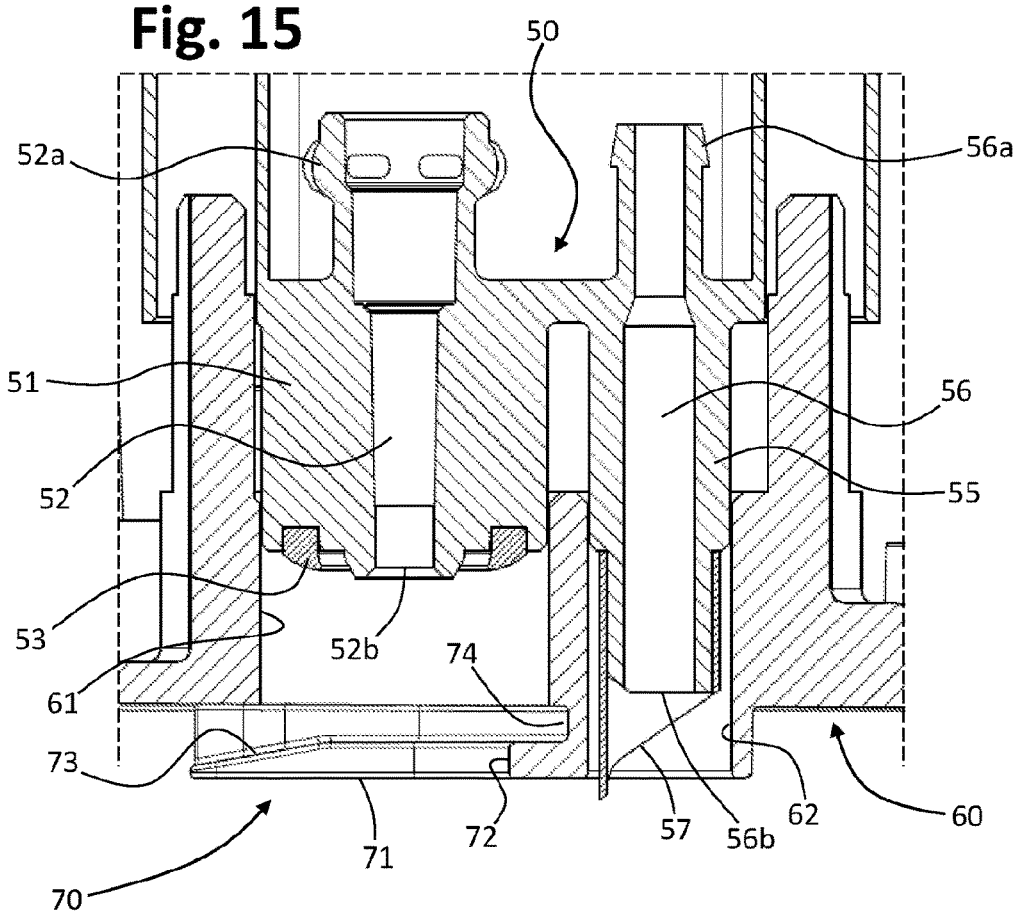
FIGS. 15 and 16 are partial and schematic mutually orthogonal sections of a dispensing head of a preparation machine according to possible embodiments of the invention.
Figure 16:
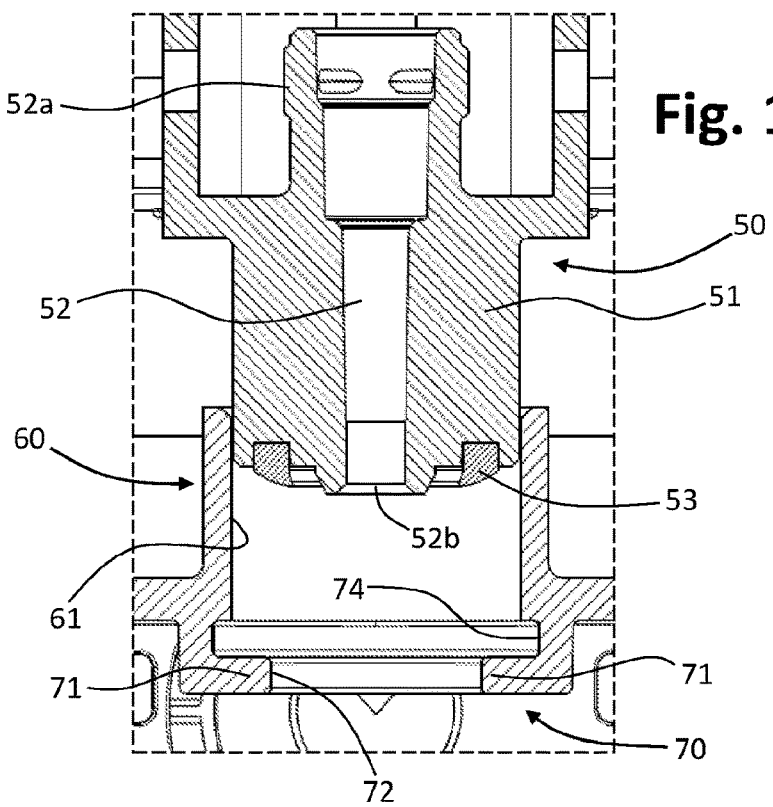

With reference in particular to FIGS. 15-16, in various embodiments the movable part 50 comprises at least one first dispensing element 51, hereinafter defined for reasons of simplicity as "first dispenser", which defines a respective internal duct 52 having an inlet 52a and an outlet 52b; in the example, the outlet 52b is located at the lower end of the first dispenser 51. The first dispenser 51 is preferentially shaped for defining, at the inlet 52a, an attachment for a tube or the like, for supply of the respective preparation fluid (here the steam), belonging to the hydraulic circuit of the machine, such as the duct 48a of FIG. 14. Preferentially, associated to the lower end of the first dispenser 51 are sealing means 53, which circumscribe the area into which the outlet 52b opens. The sealing means 53 may, for example, comprise an annular gasket made of elastomeric material, which is designed to co-operate in a sealed way with the inlet of the disposable container 11, for example with the part of the inlet defined by the flange 26 of the injector element or nozzle 20 (see FIGS. 4-5). It should be noted that, in addition or as an alternative, suitable annular sealing means, for example ones made of elastomeric material, could be provided on the element or nozzle 20, for example on the upper surface of the aforesaid flange 26, suitable for co-operating in a sealed way with the lower end of the body of the first dispenser 51.

In various preferential embodiments, functionally associated to the dispensing head is an arrangement aimed at identifying a predetermined position for the container 11 within the positioning space 5. This arrangement is preferably configured also to enable a substantially mechanical coupling with the inlet of the disposable container 11, i.e., the inlet that—in the example represented—is defined by the flange 26 of the nozzle 20 and by the matching part 18 fixed with respect to the upper wall 13 of the disposable container 11. The aforesaid coupling arrangement, designated as a whole by 70 in FIGS. 15 and 16, can be carried by the structure 2 or by the stationary part 60 of the dispensing head, and preferably extends or is able to extend at least partially outside the structure 2.

In various embodiments, the arrangement 70 is configured in such a way that the coupling is obtained by means of a movement of the aforesaid inlet (18, 26) of the container 11 in a generally traverse direction, preferably perpendicular, with respect to the direction of displacement of the first dispenser 51. Hence, in the case exemplified, where the first dispenser 51 is displaceable in a vertical direction, engagement between the inlet (18, 26) of the container 11 and the arrangement 70 is obtained by means of a displacement of the container in a substantially horizontal direction, within the positioning space 5 of the machine 1.

Figure 17:
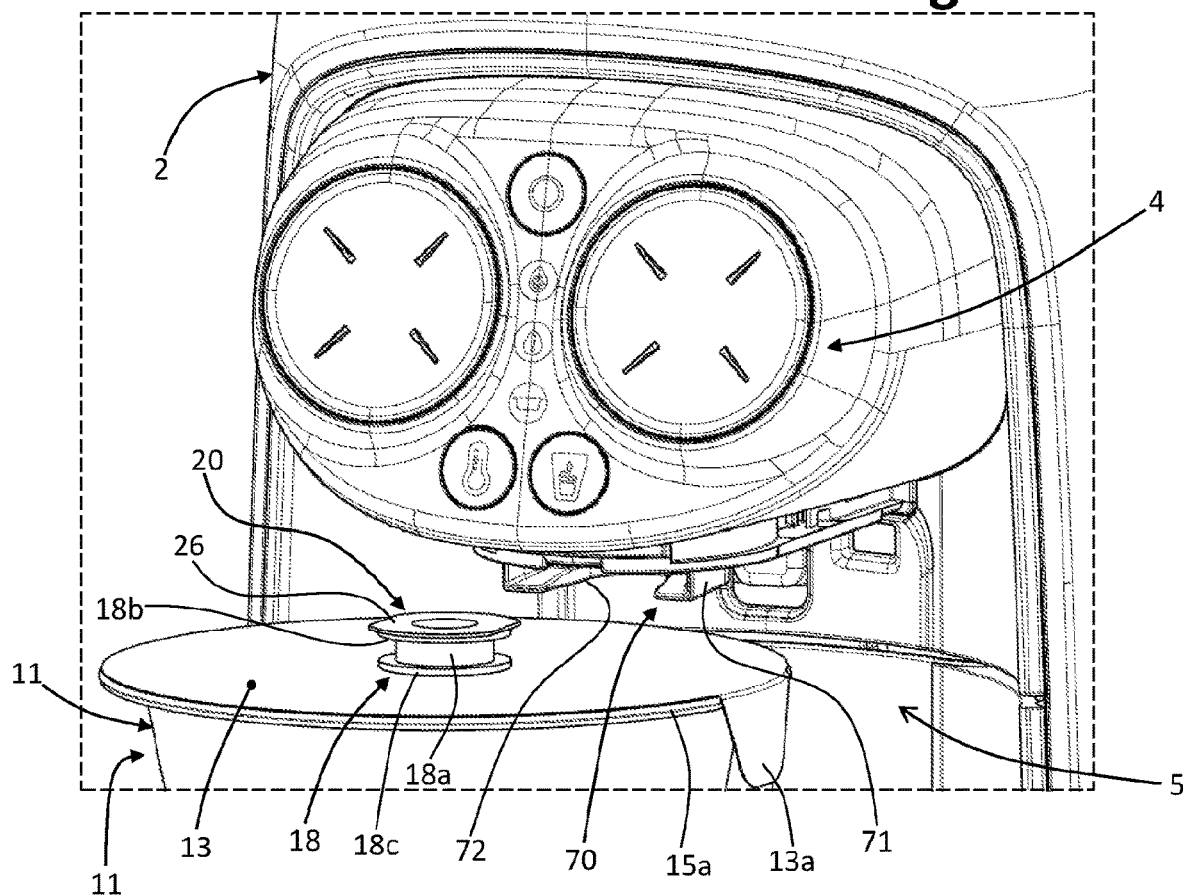
FIGS. 17 and 18 are partial and schematic perspective views of a preparation machine and of a disposable container according to possible embodiments, while they are being functionally coupled together.
Figure 18:
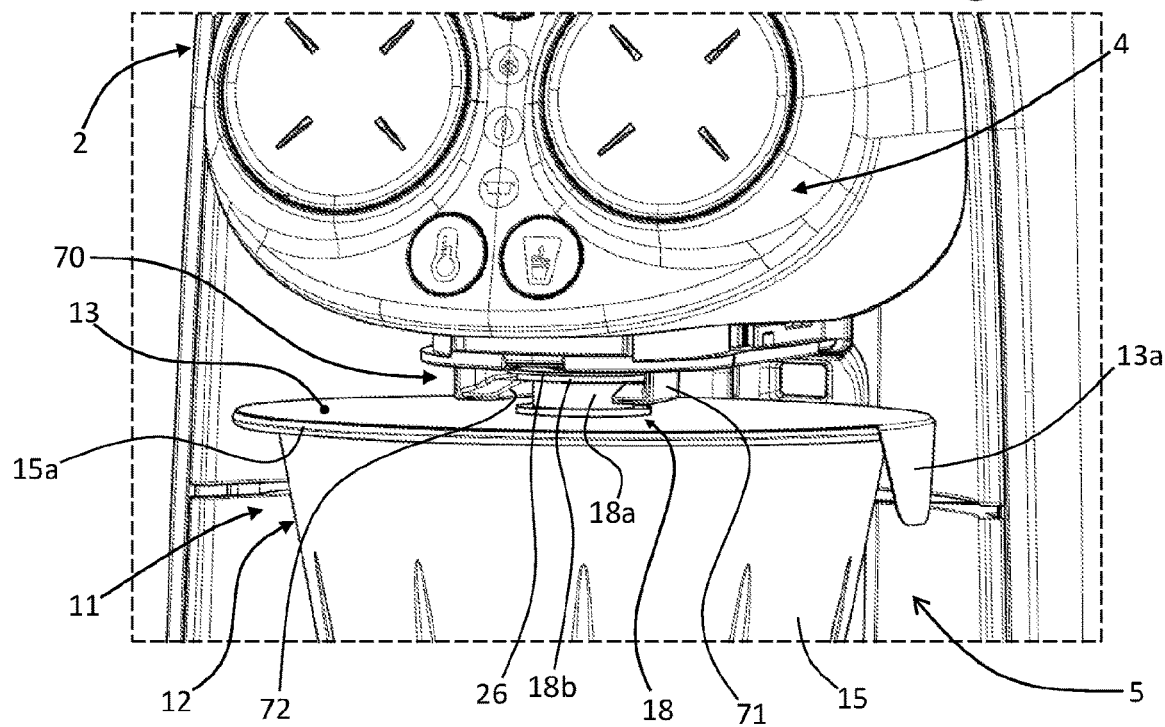

For this purpose, in various embodiments, the arrangement 70 includes a forked element, comprising two substantially parallel rails or arms 71, which are able to penetrate at least partially into the groove 18a (FIGS. 2-3) of the matching part 18 of the container 11. In other words, the two arms 71 define between them a first seat, designated by 72, which can engage with the aforesaid groove 18a. Illustrated schematically in FIGS. 17 and 18 is such an engagement step.

Preferentially, the front end of the arms 71 has at least one inclined stretch of top surface in order to define an inclined plane or lead-in 73, which facilitates insertion and coupling of the matching part 18 in the aforesaid first seat 72.

Preferentially, the arrangement 70, i.e., the arms 71 of the forked element, are shaped so as to define a second seat 74, above the arms 71, between which the upper flange 18b of the matching part 18 and the upper flange 26 of the nozzle 20 can penetrate. It will hence be appreciated that, in various embodiments, the flange 26 of the nozzle forms itself an element for coupling or positioning of the container 11 with respect to the machine 1 (moreover, as will be seen, the matching part 18 could also be absent, or differently positioned, or be integrated in the nozzle 20 or in its flange 26).

The condition of coupling of the groove 18a in the first seat 72 and of the flanges 18b and 26 in the second seat 74 is clearly visible, for example, in FIGS. 19-20, where the first dispenser 51 is in a raised position. As may be noted, the seats 72 and 74 are substantially coaxial and are aligned in an axial direction with respect to the outlet 52b of the first dispenser 51. From FIG. 17 it may also be noted how the forked element comprising the arms 71 is configured so that the seat 72 is closed at the rear in order to define a detent for the groove 18a, or an end-of-travel for transverse insertion of the matching part 18 between the arms 71.

With reference once again to FIG. 15, in various preferential embodiments, the movable part 50 of the dispensing head comprises at least one second dispensing element 55, hereinafter defined for reasons of simplicity as "second dispenser", which defines a respective internal duct 56 having an inlet 56a and an outlet 56b. In the example, the outlet 56b is located at the lower end of the second dispenser 51. Also the second dispenser 55 is preferentially shaped for defining, at the inlet 56a, an attachment for a tube or the like, for supplying a liquid food product produced in the brewing chamber 30 (here espresso coffee produced by the machine 1 via a capsule 6). The aforementioned tube, belonging to the hydraulic circuit of the machine, may be the duct designated by 48b in FIG. 14. In various embodiments, this duct 48b starts directly from the brewing chamber 30, or it is connected to the outlet of the capsule holder 32 (for example, to the part of duct designated by 32a in FIGS. 9 and 13).

Preferentially, associated to the lower end of the second dispenser 55 are piercing or tearing means 57, for example a tip or a blade, configured for piercing or tearing the upper wall 13 of the container 11 in order to enable the food product (here espresso coffee) dispensed by the second dispenser 55 to reach the inside of the chamber 16 of the container 11.

In this regard, it should be pointed out that, in preferential embodiments of the invention, the peripheral region $31_1$ of the wall or foil 13 of the container (i.e., its portion fixed in a sealed way to the flange 15a of the container body 12), on one side, and the matching part 18, on the other side, identify between them an annular region $13_3$ (see FIG. 3) of the same wall 13 that is to be pierced or torn at least locally, for example by the second dispenser 55, in order to enable introduction into the chamber 16 of the container 11 of at least one second ingredient or liquid food substance (here espresso coffee), in addition to the first ingredient or liquid food substance already contained right from the start in the container itself (here fresh cow's milk).

Preferentially, the second dispenser 55 is movable together with the first dispenser 51, laterally thereto and to the arrangement 70; i.e., it is movable substantially vertically between a respective raised or inoperative position and a lowered or operative position. For this purpose, preferentially the first dispenser 51 and the second dispenser 55 are integral with one another, to form in a single body the movable part 50 of the dispensing head, or else they are configured as distinct bodies fixed together to form the movable part 50. Once again preferentially, the stationary part 60 of the dispensing head can define a first seat 61 for guiding the linear displacement of the first dispenser 51, and a second seat 62 for guiding a corresponding linear displacement of the second dispenser 55.

Displacement of the movable part 50 between its inoperative position and its operative position can be obtained via the same actuation system 38 as the one used for producing displacement of the injector 31 of the unit 30, via an adequate mechanical transmission system. In this way, operation of the lever 38a can be exploited for causing both the displacements of the injector 31 between the position where it is set at a distance from the capsule holder 32 and the position where it is set close to the capsule holder 32 and the displacements of the movable part 50 of the dispensing head between the respective inoperative (raised) position and the respective operative (lowered) position. In other embodiments, the movable part 50 could be provided with an actuation system of its own, for example of a motor-driven type.

It should in any case be noted that, in possible variant embodiments, the dispensers 51 and 55 could be configured as distinct components movable independently of one another, via respective actuation systems.

As already mentioned, illustrated in FIGS. 19 and 20 is the condition of mechanical coupling of the inlet of the container 11 (i.e., of its matching part 18 and of the flange 26 of the nozzle 20) to the coupling arrangement 70 of the dispensing head, with the movable part 50 of the dispensing head in a raised or inoperative position.

In this condition, where the groove 18a of the matching part 18 bears upon the back end of the seat 72 defined between the arms 71, the inlet end (24, FIGS. 4-5) of the nozzle 20 is substantially coaxial to the outlet 52b of the first dispenser 51, underneath it. Given the raised position also of the second dispenser 55, its piercing means 57 extend above the foil 13 of the container 11, without constituting a hindrance to the transverse movement of coupling of the matching part 18 to the arrangement 70 of the dispensing head.

Figure 21:
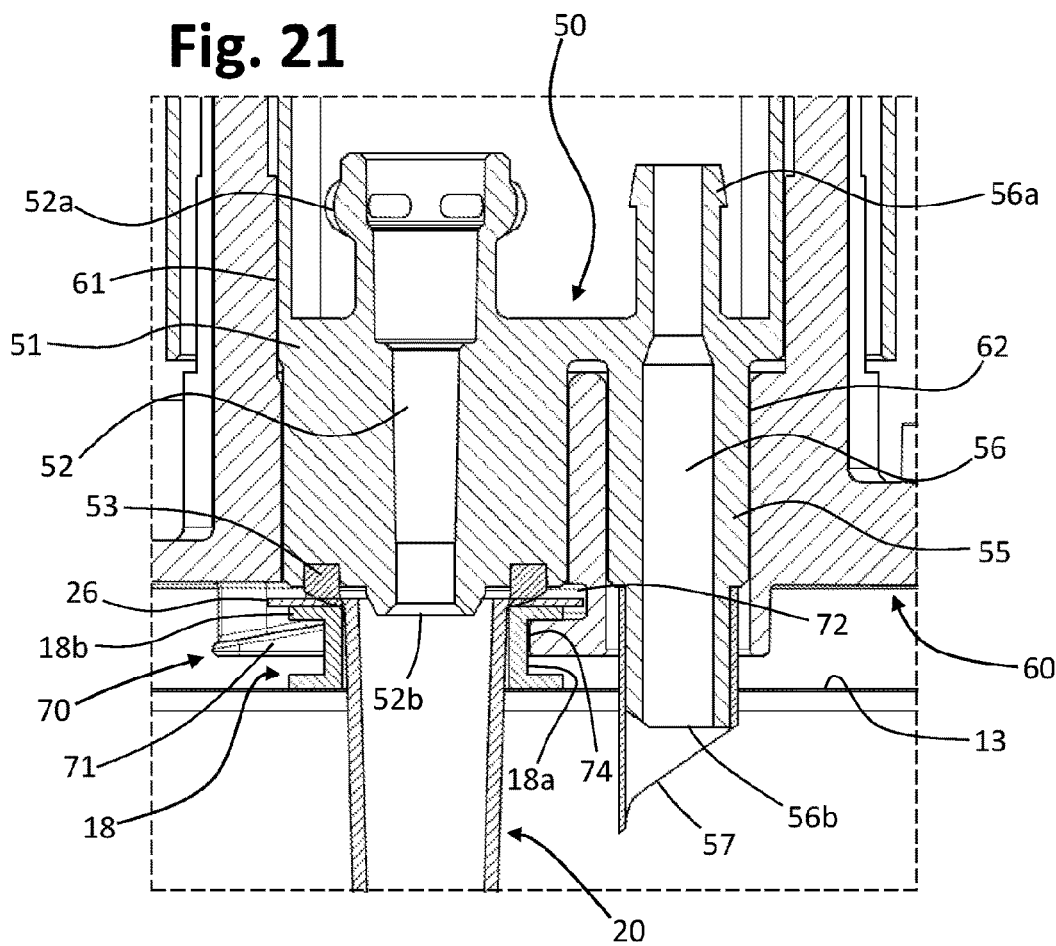
FIGS. 21 and 22 are views similar to those of FIGS. 17 and 18, with the dispensing head in a condition of hydraulic coupling with the disposable container.
Figure 22:
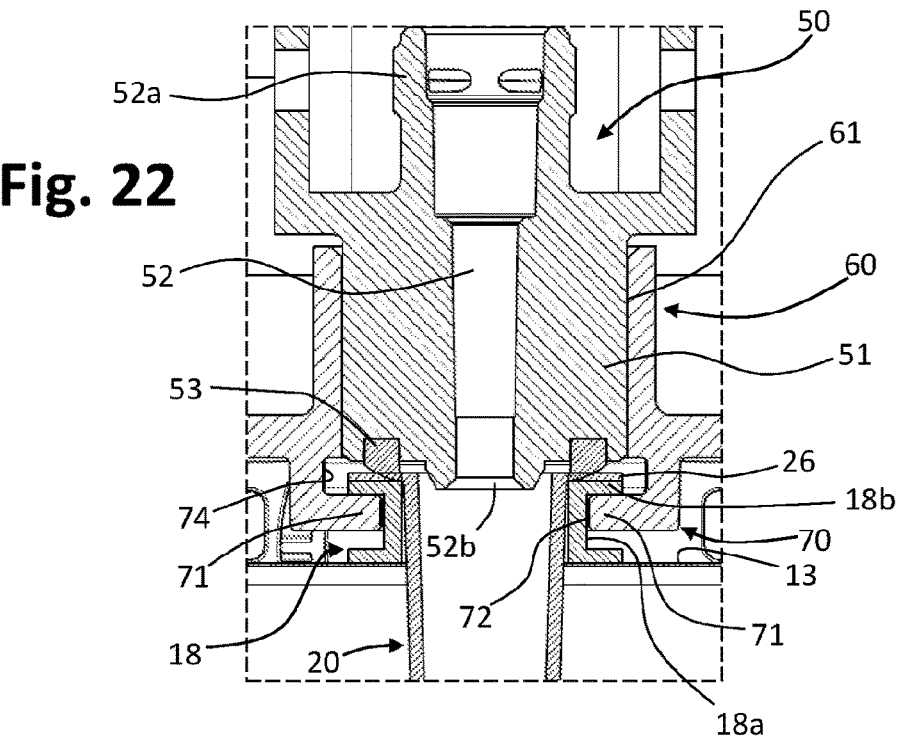

FIGS. 21 and 22 show the movable part 50 of the dispensing head, or of its dispensers 51 and 55, in the respective lowered or operative position.

Following upon lowering, the sealing means 53 of the first dispenser 51 come into contact and are pressed against the upper surface of the flange 26 of the nozzle 20, the flange 26 resting on the upper flange 18b of the matching part 18, which in turn is engaged at the bottom by the arms 71 of the forked element of the arrangement 70. In this way, the fluid seal between the outlet 52b of the first dispenser 51 and the inlet (18, 26) of the container 11 is guaranteed, without any dispersion of the preparation fluid (here steam).

It will moreover be appreciated how, in various preferential embodiments, the coupling arrangement 70 can be configured for supporting the disposable container 11, without this having to rest necessarily on the lower tray 5a of the space 5. In the example illustrated, this function is provided by the forked element, when the matching part 18 is engaged therein, as described previously. It should be noted that the arrangement 70 can also be exploited for determining the position of maximum insertion of the nozzle 20 through the matching part 18.

Lowering of the part 50 also has the effect of causing piercing or tearing of the foil 13 of the container 11 by the purposely provided means 57 of the second dispenser 55 in the region 13₃ (FIG. 3). The outlet 56b of the second dispenser 56, in the lowered operative position, projects directly into the container 11 for dispensing therein the corresponding ingredient (here espresso coffee). It should be noted that the opening made in the foil 13 by the means 57 also has the effect of enabling venting of air from the chamber 16 when the steam necessary for heating and frothing the milk 17 is introduced therein.

Figure 23:
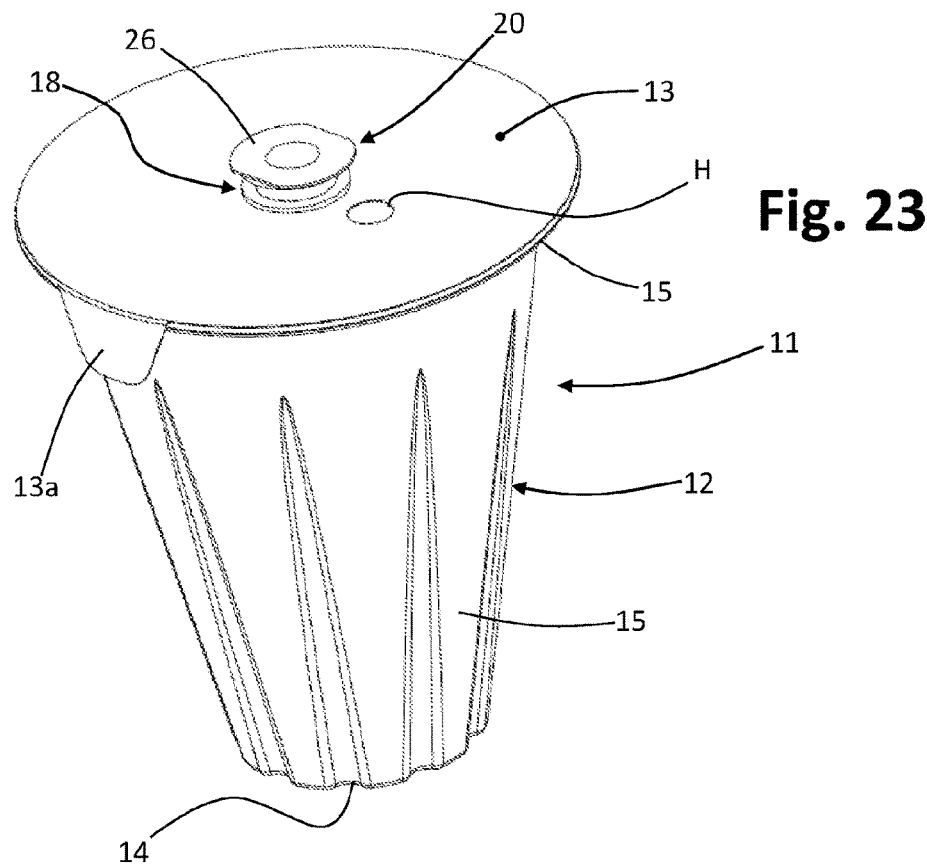
FIG. 23 is a schematic perspective view of a disposable container according to possible embodiments of the invention, after preparation of a corresponding food product.
Figure 24:
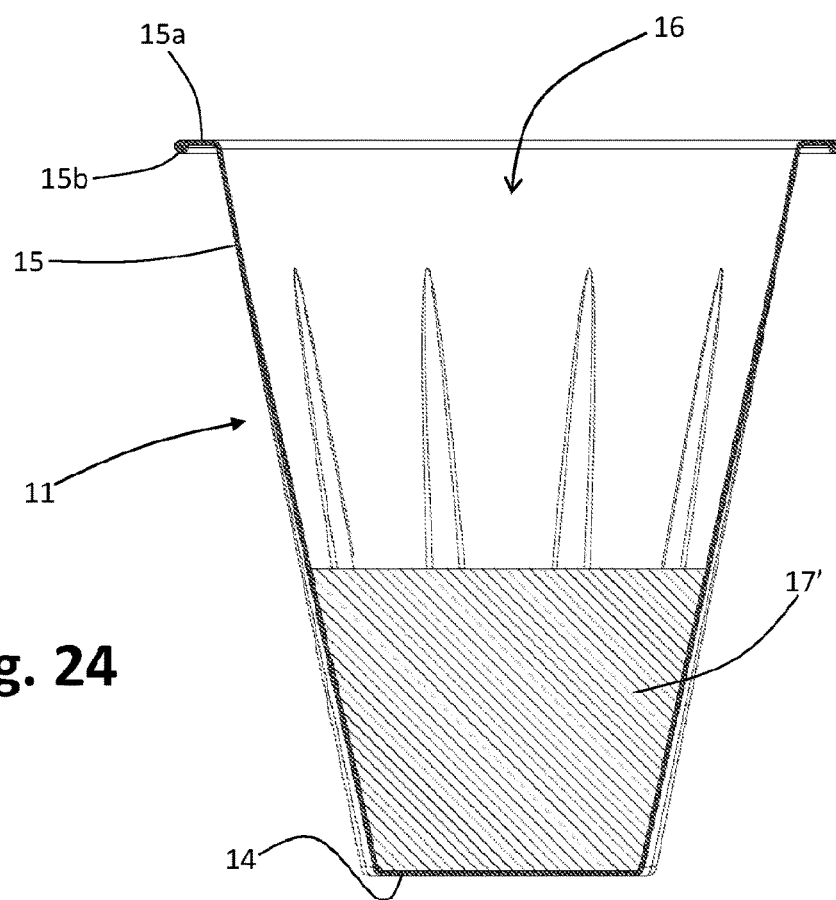
FIG. 24 is a schematic cross-sectional view of a disposable container according to possible embodiments of the invention, with some of its elements removed in view of consumption of the corresponding food product.

Visible in FIG. 23 is a container 11 after the steam and the espresso coffee have been delivered therein, with the cappuccino that is withheld within the container itself. From this figure there may be noted the presence of an opening H in the foil 13, produced by the piercing or tearing means 57 of the second dispenser 55. FIG. 24 illustrates, instead, the container 11 in a step of consumption of the cappuccino, designated by 17', where the user has removed the foil 13 with the associated matching part 18 and nozzle 20. As may be appreciated, the container 11, in addition to being used for preparing and retaining the food product 17', can then be used directly as a cup, and, as already mentioned, for this purpose it may be convenient to provide a rounded outer edge 15b for the flange 15a.

Figure 25:
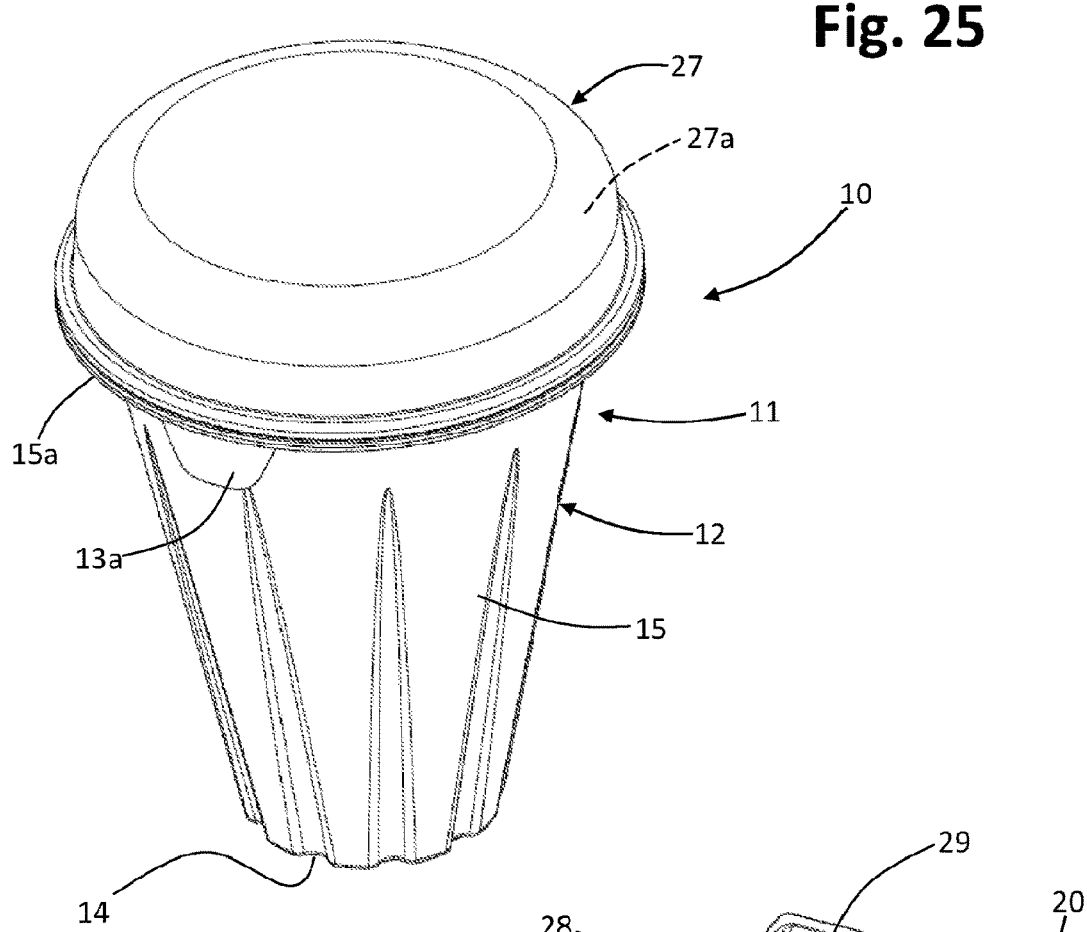
FIG. 25 is a schematic perspective view of a disposable container according to possible embodiments of the invention, provided with a corresponding lid.
Figure 26:
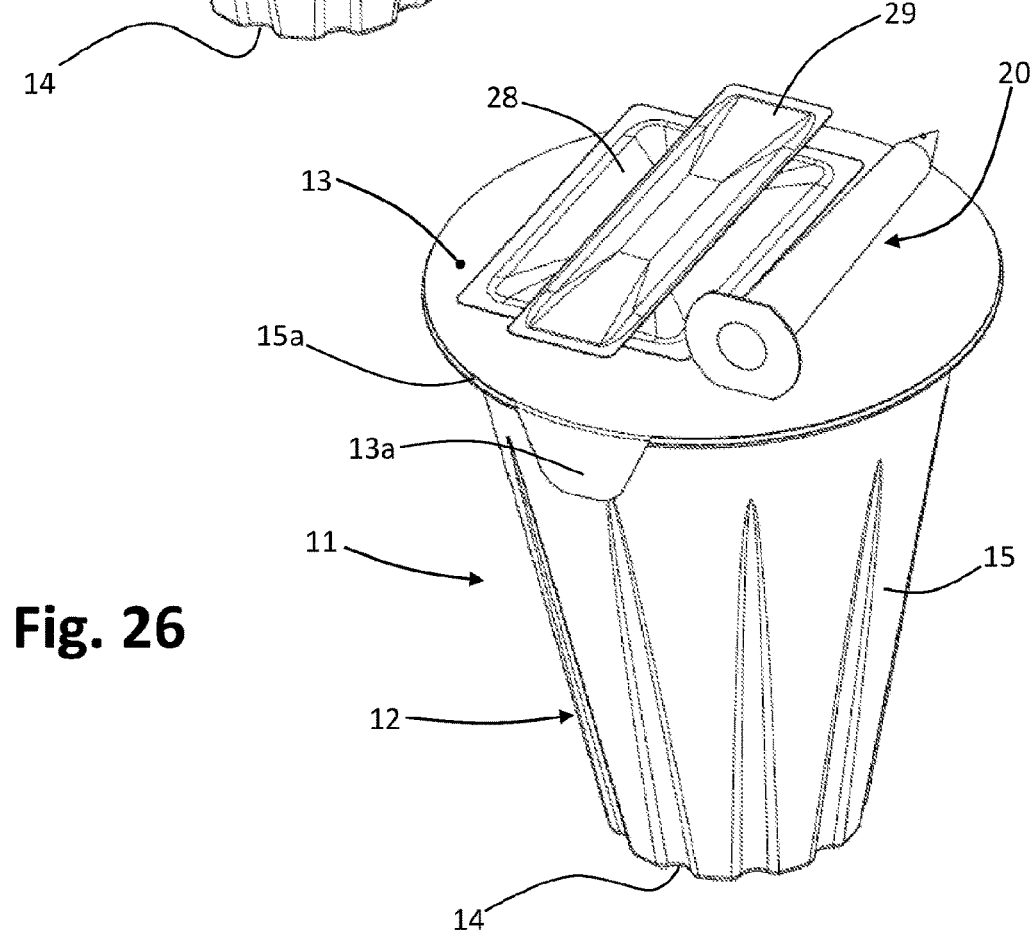
FIG. 26 is a perspective view similar to that of FIG. 25, but with the lid of the disposable container removed.

Illustrated in FIGS. 25 and 26 is a disposable container kit 10 according to a particularly advantageous embodiment of the invention, whereby the container 11 is provided with a lid 27 of its own, removably associated to the body 12, for example fitted or engaged by snap action at the flange 15a. The lid 17, made for example of plastic material, defines a cavity 27a, so that between the lid itself and the wall or foil 13 there can be housed at least the nozzle 20 (when configured as distinct part or part to be mounted) and, possibly, at least one further pre-packaged cappuccino ingredient, such as a package 28 containing a sweetener (for example, sugar) and/or a package 29 containing powdered cocoa. As may be appreciated, after removal of the lid 27, the user has free access to the nozzle 20 and to the packages 28, 29. Possibly, in the cavity 27a of the lid 27 there may be housed at least one implement, such as a spoon made of plastic material or the like, for example a mixing rod (for instance, made of plastic, or bio-plastic, or wood, or a compostable material).

It should be noted that the function indicated of the lid 27 can be performed also by a plastic film associated in a removable way to the foil 13, or to the flange 15a, or to the lateral wall 15, or again by a flexible and tearable wrapper that encloses entirely the container 11 and is designed to contain also the nozzle 20, the packages 28, 29, and the possible implement.

Use of a lid 27 may, however, prove convenient also following upon preparation of the cappuccino and after removal of the foil 13 (as in FIG. 24) for re-closing the container 11 temporarily during consumption of the cappuccino, for example to reduce dispersion of heat prior to its final consumption.

As may be appreciated, a cappuccino can be prepared according to very simple modalities. For this purpose, it will be assumed that the container 10 illustrated in FIG. 10 is used and that this is preserved in a refrigerated environment, for example a household fridge.

The user raises the lever 38a of the machine 1 in order to bring about opening of the brewing unit (FIG. 8) and gain access to the inlet passages 2a and 33, and introduces a capsule 6 for preparing espresso coffee into the machine, which reaches the retention means 36. It will be assumed that, in the case exemplified herein, raising of the lever 38a will determine also passage of the movable part 50 of the dispensing head into the respective raised position.

The user then takes the container 10 out of the fridge and removes the lid 27, in order to gain access to the nozzle 20 and to the packages 28, 29. The user then inserts the nozzle 20 into the cavity 19 of the matching part 18, bringing about tearing of the foil 13 in the region 13₂ using the tip 23 of the nozzle 20 and a possible pre-cut or weakening of the foil 13 in the region 13₂. The nozzle 20 is inserted as far as the aforesaid position of maximum insertion, for example in which the flange 26 of the nozzle itself comes to bear upon the upper flange 18b of the matching part (as explained previously, the maximum limit of insertion of the nozzle 20 through the matching part 18 can be obtained also in another way, for example exploiting the conicity of the nozzle).

The container 11 is then brought to the machine 1 and set in the positioning space 5. As explained, in this step the container 11 is translated by the user in a substantially horizontal direction so that the inlet (18, 26) of the container engages in a mechanical way with the coupling arrangement 70, as described previously (see FIGS. 17-18). Next, the user lowers the lever 38a of the machine 1 so as to close the brewing unit 30 (FIG. 12), with the capsule 6 that is enclosed inside the brewing chamber 31-32 and (in the example considered) so as to cause lowering of the movable part 50 of the dispensing head (FIGS. 21-22). In this way, as explained above, sealed coupling is obtained between the outlet end 52b of the first dispenser 51 and the inlet of the container 11 (i.e., the flange 26 of the nozzle 20), as well as piercing of the foil 13 by the corresponding means 57 of the second dispenser 55, with the outlet end of the latter that thus faces directly the inside of the container 11.

At this point, the user can start the preparation program via the user interface 4 of the machine 1. The control system 39 of the machine controls the pump 43, the boiler 44, and the distributor 46 (FIG. 14) in order to supply steam to the first dispenser 51, i.e., to the nozzle 20, and then inside the container 11 so as to heat and froth the corresponding dose of milk 17. Next, the control system controls the pump 43, the boiler 44, and the distributor 46 (FIG. 14) in order to supply hot water to the brewing chamber 31-32 so as to obtain the espresso coffee, which reaches the second dispenser 56 for being introduced into the container 11 already containing the frothed milk.

At the end of the preparation program, the machine lever 38a can be raised so as to bring about unloading of the spent capsule 6 from the brewing unit 30 and raising of the movable part 50 of the dispensing head. The container 11, which contains the cappuccino 17', can then be removed from the housing space, with a horizontal movement opposite to the previous one in order to bring about disengagement between the inlet (18, 26) of the container 11 and the coupling arrangement 70.

The user can then remove the foil 13, using the tab 13a, and the associated matching part 18 and nozzle 20, and then proceed to consuming the cappuccino.

It will be appreciated that in the control system of the machine 1 an operating program can be stored, dedicated for preparing cappuccino (or some other food product), for example of the type in which the timing/amounts for dispensing of the steam and the espresso coffee are optimized also according to the pre-set amount of milk 17 contained in the container 11.

In various particularly advantageous embodiments, the machine 1 is prearranged for automatic recognition of the container 11, for example for detecting the presence of the container itself in the space 5 and/or for selecting and/or starting in an automatic way a corresponding preparation program. A system for detection of the presence and/or for recognition of the container 11 can be based upon the use of a mechanical sensor (for example, a microswitch) or a sensor of a contactless type (for example, an optical sensor, or a proximity switch, or an inductive sensor, or an RFID). For instance, a system for identification of the container 11 may, for example, be based upon the use of an optical sensor, capable of recognizing or discriminating various colours, or logos, or graphic codes, and the foil 13 for sealing the container 11 may present various colours, or present different logos or graphic codes, according to the type of ingredient 17.

It will be appreciated in fact that the concepts exemplified previously in relation to preparation of a cappuccino are applicable also to the preparation of other food products. Consider, for example, the case of a container 11, the ingredient 17 of which is a broth or a liquid base for soups, to which there can be associated various soluble or lyophilized preparations, contained in respective capsules 6 at the choice of the consumer. In such a case, the first dispenser 51 can be used for heating with steam the broth or the pre-packaged base in the container 11, and a given capsule 6 can be used for adding a further ingredient, as exemplified for cappuccino. Of course the control system of the machine will be prearranged with corresponding optimised preparation programs. Possibly, the machine 1 could also be equipped with presence-sensor means and/or means for recognition of the capsule 6, in order to prevent start of a cycle of preparation of a food product in the absence of a capsule 6 in the unit 30, or else prevent start of such a cycle when the capsule 6 loaded in the machine is incompatible with the contents of the container 11 detected in the positioning space 5.

The given dose of ingredient 17 pre-packaged in the container 11 does not necessarily have to be in the liquid state, it possibly consisting of a solid substance, for example a soluble or lyophilized substance (such as a lyophilized broth or a base for soups). For such cases, the corresponding preparation program stored in the control system of the machine may conveniently envisage delivery into the container 11 of an amount of heated water, via the first dispenser 51, where the amount and the temperature of the water delivered are preset according to the ingredient 17. The function of introduction of water (or steam) into the container 11 could in any case be controlled manually by the user, for example via the user interface.

It is also possible for the preparation program stored to envisage use of the first dispenser 51 for delivering initially an amount of hot water and then a certain amount of steam in order to obtain a sort of mixing of the contents, exploiting the swirling motion that the steam can induce. On the other hand, for similar cases in which the addition of a further ingredient via a capsule 6 is not indispensable, the operating program can envisage that the hot water be delivered to the container 11 via the second dispenser 55 (and hence with passage through the brewing chamber 31-32), and the steam be delivered to the container 11 via the first dispenser 51, as already described above.

From the foregoing description, the characteristics of the present invention emerge clearly, as likewise do its advantages, principally represented by the hygiene of the solution proposed, by its simplicity of use, and by the fact that the quality of the final food products can be rendered substantially independent of the skill of the person carrying out on-the-spot preparation thereof. A further advantage of the preferential solution proposed is represented by the fact that, since the disposable container described can be used directly also for consumption of the beverage, transfer of the preparation into a different container may be avoided, and the consequent losses of aesthetic appearance and characteristics of the froth.

It is clear that numerous variations may be made by the person skilled in the branch to the system, the machine, and the disposable container for preparing food products described above, without thereby departing from the scope of the invention, as defined by the ensuing claims.

Previously, there has been exemplified the case of a preparation machine provided with a system of mechanical actuation with manual lever operation, which brings about both opening/closing of the brewing unit and raising/lowering of the movable part of the dispensing head but, as mentioned, this does not constitute an essential characteristic. Both the brewing unit and the dispensing head could present movements independent of one another, and also the first and second dispensers could be displaceable independently of one another. Moreover, both the dispensing unit and the dispensing head could be motor-driven, possibly with the first and second dispensers motor-driven independently. Also possible is a mixed embodiment, for example with one of the brewing unit and the dispensing head provided with a motor-driven actuation system, and the other provided with a manual actuation system, or again with one of the two dispensers motor-driven and the other manually displaceable via a mechanical system.

As already mentioned, the disposable container according to the invention could be produced so as to include right from the start the nozzle 20, for example made of a single piece with the matching part 18, in which case the sealing functions described for the flange 26 of the nozzle 20 would be performed by the upper flange 18b of the matching part 18. For such a case, moreover, the region $13_2$ of the foil could be absent or pre-pierced, and the axial cavity of the ensemble made up of the matching part 18 and the nozzle 20 could be closed at the top in a sealed way by means of a sealing film. This film could be of a peelable type that can be manually removed by the user, or else pierceable or tearable by a suitable tip or blade, for example carried by the first dispenser 51 within the region thereof circumscribed by the sealing means 53, or else be pre-cut or weakened in order to enable tearing thereof as a result of the pressure exerted by the fluid coming out of the first dispenser 51.

As already mentioned, the coupling or positioning element (18) does not necessarily have to be associated to the wall 13, its functions of coupling with respect to the dispensing element of the machine possibly in fact being obtained by a suitable conformation of the nozzle 20.

In other possible embodiments, the coupling or positioning element (18) can extend partially or completely underneath the wall 13. For instance, in the case where the element 18 is associated to the inner side of the wall 13 so as to extend completely within the volume 16, on the top surface of the wall 13 a suitable graphic indication can be provided aimed at indicating to the user the area in which to insert the injector element or nozzle 20, or the area in which to tear the wall via the tip 23 of the element 20 itself. In this case, it will be the inlet part of the nozzle 20 that is configured for mechanical and/or hydraulic coupling with respect to the dispensing head of the preparation machine. In the case where the elements 18 and 20 are made of a single piece that extends completely within the volume 16 starting from the wall 13, the latter could possibly be weakened at the inlet (24) of such a single piece, for example in order to be torn as a result of the pressure by the fluid injected. In the case of an injector element 20 that extends completely within the volume 16, the corresponding coupling or positioning element could be constituted by the flange 26 of the injector element itself, without the need for a further functional element of the type designated by 18.

It will be appreciated that the position of insertion of the injector element or nozzle 20 through the wall 13 of the container 11 does not necessarily have to be identified by a coupling or positioning element, such as the matching part 18. In any case, moreover, the aforesaid position of insertion, even in the presence of such an element, does not necessarily have to be central with respect to the wall 13.

In other embodiments (not illustrated), for example in the case where the coupling or positioning element extends completely within the chamber 16, the function of identifying a preset position for the container 11 within the area 5 of the machine can be obtained with means different from the element itself and from the arrangement designated previously by 70. For instance, for this purpose, the structure 2 of the machine 1 could define in the area 5 a seat or a support in which to couple the container 11, for example at its flange 15a.

As already mentioned, the food substance pre-packaged in the disposable container may be of various types, preferentially corresponding to which are different functional conditions of preparation, for example different volumes and/or fillings of the container 11 and/or different lengths of the injector element 20. Likewise, the preparation machine 1 will be preferably provided with a plurality of corresponding programs distinguished also by different operating parameters (such as duration, pressure, temperature of injection of the fluid into the container). These various programs could be selectable directly by the user, for example via the user interface 4, or else be selected directly by the control system of the machine thanks to automatic recognition of the container, as mentioned previously.

It will be appreciated that the disposable container 11 described can also be used separately from the brewing unit 30 of the machine 1, in particular when the ingredient, or precursor, or substance, or food product pre-packaged in the container 11 requires for its preparation (dilution, or heating, or dissolving, or reconstitution, etc., according to the type of contents) just the supply of water and/or steam, without any need for further ingredients that can be produced via the brewing unit 30. In this perspective, a machine 1 could also be configured for just introduction of steam and/or hot water into the container 11. It is in any case preferable for the dispensing head, even when it is intended only for introduction of steam and/or hot water into the container, to be provided with means (for example, a tip or a blade) for tearing the wall 13 locally and enabling venting of air present inside the container itself in the course of preparation of the food product.

In other embodiments (not represented), the preparation machine may comprise, instead of a dispensing head of the type described, a tube or a wand for dispensing water and/or steam, which can be oriented manually by the user outside the stationary structure of the machine, or else a stationary attachment external to the structure, to which the inlet of the container 11 is to be coupled. In embodiments of this type, it is hence not indispensable to set the container 11 in the positioning area 5 of the machine. Preferentially, such a tube, or wand, or attachment is provided, at its dispensing end, with an arrangement for mechanical/hydraulic coupling to the inlet of the container 11, designed to guarantee the necessary seal. Such an arrangement could, for example, include a terminal part of the tube or wand, configured for fitting within or around the inlet end of the nozzle 20, possibly provided with a sealing gasket. The aforementioned attachment could instead be configured for receiving in a sealed way an inlet portion of the nozzle 20, with the inlet portion that in this case could be L-shaped. The tube, wand, or attachment can conveniently be provided with a tip or the like, preferably parallel to its point of release of the water and/or steam, for cutting the entry wall of the container in order to provide a vent.

In the embodiments exemplified in the figures, the injector element 20 extends substantially perpendicular to the entry wall 13, but of course in other embodiments the container could be prearranged so as to have the injector element that extends with a different inclination.

The preparation machine, or its dispensing head, could also include just one dispensing element, such as the dispenser 51, which can be used both for dispensing the second food substance and for dispensing the pressurized hot water and/or steam. In possible embodiments of this type, for example, it could be possible for such a dispensing element to be selectively connected—for example via valve means that can be controlled by the control system—to an outlet of a brewing unit of the type designated previously by 30 and to an outlet of a boiler of the type designated previously by 44, respectively. In embodiments of this type the control system of the machine could be equipped with an operating program suitable for controlling dispensing first hot water or steam and then the second food substance into the container 1 (or vice versa). Also in embodiments of this type, moreover, a suitable element could be provided, such as a tip or a blade, for piercing or tearing the entry wall 13 of the container 1 locally and enabling venting of air present within the container itself in the course of preparation of the food product.

The invention claimed is:

1. A system for preparing a food product to be consumed, comprising a preparation machine and a sealed disposable container for preparing the food product to be consumed and for retaining thereinto the food product to be consumed after preparation thereof,
    wherein the disposable container comprises a liquid-retaining container body configured for retaining the food product to be consumed, the liquid-retaining container body having an entry wall, a bottom wall opposite to the entry wall, and a lateral wall, which define an internal volume, pre-packaged in which is a predetermined amount of at least one first food substance required for preparation of the food product to be consumed,
    wherein the preparation machine comprises at least a stationary structure, a hydraulic circuit, and a control system,
    wherein the hydraulic circuit comprises at least one water-supply source, means for heating water, and pumping means,
    wherein the hydraulic circuit further comprises a first dispensing element, designed to be supplied with pressurized hot water and/or steam,
    wherein:
        the disposable container, substantially at the entry wall thereof, has an axially hollow coupling element, which defines at least part of an inlet of the disposable container;
        the disposable container further comprises an axially extending injector element, couplable with the coupling element or integrally formed or fixed therewith, in such a way that at least a first distal portion of the injector element extends within the internal volume;
        the first dispensing element and at least one of the coupling element and the injector element are configured for mutual coupling, for introducing into the internal volume a flow of pressurized hot water and/or steam required for preparing the food product to be consumed,
    wherein the hydraulic circuit is controllable for conveying pressurized hot water and/or steam to the first dispensing element, for corresponding injection into the internal volume of the disposable container through the injector element,
    and wherein the entry wall is configured for removal from the liquid-retaining container body, for enabling a user to directly access the internal volume and consume therefrom the food product to be consumed which has been prepared and retained within the liquid-retaining container body.

2. The system according to claim 1, wherein:
    the stationary structure of the preparation machine defines a container-positioning area;
    the first dispensing element is part of a dispensing head that is carried by the stationary structure of the preparation machine and faces towards the container-positioning area; and
    the dispensing head is configured for coupling of the first dispensing element with at least one of the coupling element and the injector element of the disposable container when the disposable container is positioned in a substantially predetermined position within the container-positioning area.

3. The system according to claim 2, wherein the dispensing head comprises a movable part and a stationary part for guiding the movable part, the movable part being displaceable between an inoperative or raised position and an operative or lowered position with respect to the container-positioning area.

4. The system according to claim 2,
    wherein the dispensing head comprises a movable part and a stationary part for guiding the movable part, the movable part being displaceable between an inoperative or raised position and an operative or lowered position with respect to the container-positioning area, and
    wherein the movable part of the dispensing head comprises the first dispensing element, and at least one of the first dispensing element and the inlet of the disposable container has a sealing arrangement, which is able to co-operate in a sealed way with the other one of the first dispensing element and the inlet of the disposable container when the movable part of the dispensing head is in the respective operative or lowered position.

5. The system according to claim 1, wherein the injector element of the disposable container is a part distinct from the container body that includes the entry wall, the bottom wall, and the lateral wall, the injector element being configured for insertion through said coupling element.

6. The system according to claim 5, wherein at least one of said coupling element or the injector element has end-of-travel means that are able to co-operate with the other one of the injector element or said coupling element for defining a predefined position of the first distal portion of the injector element in the internal volume.

7. The system according to claim 1, wherein the entry wall defines a gripping tab.

8. The system according to claim 1, wherein the entry wall of the disposable container includes a pierceable foil having a peripheral region fixed in a sealed way at an upper edge of the lateral wall, between the peripheral region and the at least one coupling element there being defined a region of the pierceable foil that is to be pierced by a dispensing element of the preparation machine.

9. The system according to claim 1, wherein the injector element of the disposable container has at least one outlet opening in its first distal portion, at a height greater than the level of the first food substance contained in the internal volume.

10. The disposable container of the system according to claim 1, the disposable container being configured for preparing the food product to be consumed and for retaining the food product to be consumed after preparation thereof, wherein the disposable container comprises said liquid-retaining container body configured for retaining the food product to be consumed, and has said entry wall, said bottom wall opposite to the entry wall, and said lateral wall, which define said internal volume, packaged in which is said predetermined amount of said at least one first food substance required for preparation of the food product to be consumed, wherein, substantially at the entry wall, the disposable container has said axially hollow coupling element, which defines at least part of said inlet of the disposable container, wherein the disposable container comprises said axially extending injector element, which is couplable to the coupling element or is integrally formed or fixed thereto, in such a way that at least said first distal portion of the injector element extends within the internal volume, wherein the least one of the coupling element and the injector element of the disposable container is configured for coupling with said first dispensing element of the preparation machine, for introducing into the internal volume a flow of pressurized hot water and/or steam necessary for preparing the food product to be consumed, and wherein the entry wall is configured for removal from the liquid-retaining container body, for enabling a user to directly access the internal volume and consume therefrom the food product to be consumed which has been prepared and retained within the liquid-retaining container body.

11. The machine of the system according to claim 1, for preparing the food product to be consumed, comprising said stationary structure, said hydraulic circuit, and said control system, wherein the hydraulic circuit comprises said at least one water-supply source, said means for heating water, and said pumping means, wherein the hydraulic circuit further comprises said first dispensing element, which can be supplied with pressurized hot water and/or steam, wherein the first dispensing element is configured for coupling with said inlet of said disposable container for preparing the food product to be consumed and for retaining the food product to be consumed after preparation thereof, and wherein the hydraulic circuit is controllable for conveying pressurized hot water and/or steam to the first dispensing element.

12. A method for preparing the food product to be consumed in the system according to claim 1, comprising the steps of:

providing said disposable container for preparing the food product to be consumed and for retaining the food product to be consumed after preparation thereof, having said internal volume containing said predetermined amount of at least one first food substance required for preparation of the food product to be consumed;

providing said preparation machine, having said stationary structure and said hydraulic circuit that comprises said first dispensing element and a second dispensing element;

arranging the disposable container in a predetermined position within a positioning area of the preparation machine to bring about coupling between the first dispensing element and the inlet of the disposable container;

introducing into the internal volume of the disposable container pressurized hot water and/or steam, through the inlet and said injector element of the disposable container, which extends axially within the internal volume;

introducing into the internal volume of the disposable container a second liquid food substance produced in the preparation machine, via the second dispensing element, following upon piercing or tearing of said entry wall of the disposable container, and removing the entry wall from the liquid-retaining container body, for enabling a user to directly access the internal volume and consume therefrom the food product to be consumed which has been prepared and retained within the liquid-retaining container body.

13. A system for preparing a food product, comprising a preparation machine and a sealed disposable container for preparing and retaining the food product, wherein the disposable container has an entry wall, a bottom wall opposite to the entry wall, and a lateral wall, which define an internal volume, pre-packaged in which is a predetermined amount of at least one first food substance or of a precursor thereof, wherein the preparation machine comprises at least a stationary structure, a hydraulic circuit, and a control system, wherein the hydraulic circuit comprises at least one water-supply source, means for heating water, and pumping means, wherein the hydraulic circuit further comprises a first dispensing element, designed to be supplied with pressurized hot water and/or steam, wherein:
the disposable container, substantially at the entry wall thereof, has an axially hollow coupling element, which defines at least part of an inlet of the disposable container;

the disposable container comprises an axially extending injector element, couplable with the coupling element or integrally formed or fixed therewith, in such a way that at least a first distal portion of the injector element extends within the internal volume;

the first dispensing element and at least one of the coupling element and the injector element are configured for mutual coupling, wherein the hydraulic circuit is controllable for conveying pressurized hot water and/or steam to the first dispensing element, for corresponding injection into the internal volume of the disposable container through the injector element, wherein the preparation machine further comprises a preparation unit, which includes a preparation chamber suitable for receiving a dose of a precursor of at least one second food substance, and dispensing the second food substance following upon passage of water and/or steam through the preparation chamber, the hydraulic circuit being configured for supplying pressurized hot water and/or steam to the preparation chamber.

14. The system according to claim 13, wherein the hydraulic circuit of the preparation machine comprises a second dispensing element, which is connected in fluid communication with an outlet of the preparation chamber and is configured for introducing the second food substance into the internal volume, following upon piercing or tearing of the entry wall of the disposable container.

15. The system according to claim 14,
wherein the dispensing head comprises a movable part and a stationary part for guiding the movable part, the movable part being displaceable between an inoperative or raised position and an operative or lowered position with respect to the container-positioning area, and
wherein the movable part of the dispensing head comprises the second dispensing element and has piercing or tearing means, which are able to pierce or tear the entry wall of the disposable container during passage of the movable part of the dispensing head from the inoperative or raised position to the operative or lowered position.

16. The system according to claim 13, wherein the control system of the preparation machine comprises at least one of:
a pre-stored operating program configured for controlling dispensing of the second food substance and delivery of pressurized hot water and/or steam into the disposable container;
a sensor system for detecting presence of the disposable container and/or the type thereof.

17. The system according to claim 13, further comprising at least one capsule, or pod, or tablet containing the dose of precursor of the at least one second food substance, the preparation chamber being prearranged for receiving the at least one capsule, or pod, or tablet.

18. A system for preparing a food product, comprising a preparation machine and a sealed disposable container for preparing and retaining the food product,
wherein the disposable container has an entry wall, a bottom wall opposite to the entry wall, and a lateral wall, which define an internal volume, pre-packaged in which is a predetermined amount of at least one first food substance or of a precursor thereof,
wherein the preparation machine comprises at least a stationary structure, a hydraulic circuit, and a control system,
wherein the hydraulic circuit comprises at least one water-supply source, means for heating water, and pumping means,
wherein the hydraulic circuit further comprises a first dispensing element, designed to be supplied with pressurized hot water and/or steam,
wherein:
the disposable container, substantially at the entry wall thereof, has an axially hollow coupling element, which defines at least part of an inlet of the disposable container,
the disposable container comprises an axially extending injector element, couplable with the coupling element or integrally formed or fixed therewith, in such a way that at least a first distal portion of the injector element extends within the internal volume,
the first dispensing element and at least one of the coupling element and the injector element are configured for mutual coupling,
wherein the hydraulic circuit is controllable for conveying pressurized hot water and/or steam to the first dispensing element, for corresponding injection into the internal volume of the disposable container through the injector element,
wherein:
the stationary structure of the preparation machine defines a container-positioning area;
the first dispensing element is part of a dispensing head that is carried by the stationary structure of the preparation machine and faces towards the container-positioning area, and
the dispensing head is configured for coupling of the first dispensing element with at least one of the coupling element and the injector element of the disposable container when the disposable container is positioned in a substantially predetermined position within the container-positioning area,
wherein the hydraulic circuit of the preparation machine comprises a second dispensing element, which is connected in fluid communication with an outlet of a preparation chamber of the preparation machine, and is configured for introducing a second food substance into the internal volume, and
wherein the dispensing head of the preparation machine comprises the second dispensing element and is configured for introducing the second food substance into the internal volume when the disposable container is in said substantially predetermined position.

19. A system for preparing a food product, comprising a preparation machine and a sealed disposable container for preparing and retaining the food product,
wherein the disposable container has an entry wall, a bottom wall opposite to the entry wall, and a lateral wall, which define an internal volume, pre-packaged in which is a predetermined amount of at least one first food substance or of a precursor thereof,
wherein the preparation machine comprises at least a stationary structure, a hydraulic circuit, and a control system,
wherein the hydraulic circuit comprises at least one water-supply source, means for heating water, and pumping means,
wherein the hydraulic circuit further comprises a first dispensing element, designed to be supplied with pressurized hot water and/or steam,
wherein:
the disposable container, substantially at the entry wall thereof, has an axially hollow coupling element, which defines at least part of an inlet of the disposable container,
the disposable container comprises an axially extending injector element, couplable with the coupling element or integrally formed or fixed therewith, in such a way that at least a first distal portion of the injector element extends within the internal volume,
the first dispensing element and at least one of the coupling element and the injector element are configured for mutual coupling,
wherein the hydraulic circuit is controllable for conveying pressurized hot water and/or steam to the first dispensing element, for corresponding injection into the internal volume of the disposable container through the injector element,
wherein:
the stationary structure of the preparation machine defines a container-positioning area,
the first dispensing element is part of a dispensing head that is carried by the stationary structure of the preparation machine and faces towards the container-positioning area, and the dispensing head is configured for coupling of the first dispensing element with at least one of the coupling element and the injector element of the disposable container when the disposable container is positioned in a substantially predetermined position within the container-positioning area, wherein the preparation machine comprises a coupling arrangement configured for identifying the substantially predetermined position of the disposable container within the container-positioning area and/or for providing a coupling of a substantially mechanical type with the disposable container.

20. A system for preparing a food product, comprising a preparation machine and a sealed disposable container for preparing and retaining the food product, wherein the disposable container has an entry wall, a bottom wall opposite to the entry wall, and a lateral wall, which define an internal volume, pre-packaged in which is a predetermined amount of at least one first food substance or of a precursor thereof, wherein the preparation machine comprises at least a stationary structure, a hydraulic circuit, and a control system, wherein the hydraulic circuit comprises at least one water-supply source, means for heating water, and pumping means, wherein the hydraulic circuit further comprises a first dispensing element, designed to be supplied with pressurized hot water and/or steam, wherein:

the disposable container, substantially at the entry wall thereof, has an axially hollow coupling element, which defines at least part of an inlet of the disposable container;

the disposable container comprises an axially extending injector element, couplable with the coupling element or integrally formed or fixed therewith, in such a way that at least a first distal portion of the injector element extends within the internal volume;

the first dispensing element and at least one of the coupling element and the injector element are configured for mutual coupling, wherein the hydraulic circuit is controllable for conveying pressurized hot water and/or steam to the first dispensing element, for corresponding injection into the internal volume of the disposable container through the injector element, wherein the food product is liquid cappuccino, and the first food substance is a dosed amount of liquid milk contained in the disposable container.

* * * * *